(12) United States Patent
Wan et al.

(10) Patent No.: US 12,199,566 B2
(45) Date of Patent: Jan. 14, 2025

(54) LINKAGE PROTECTION SYSTEM AND METHOD FOR PHOTOVOLTAIC POWER STATION

(71) Applicant: Huawei Digital Power Technologies Co., Ltd., Shenzhen (CN)

(72) Inventors: Song Wan, Shanghai (CN); Yongbing Gao, Shanghai (CN); Xun Wang, Shanghai (CN); Yanzhong Zhang, Shanghai (CN); Zhipeng Wu, Shenzhen (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 265 days.

(21) Appl. No.: 17/896,730

(22) Filed: Aug. 26, 2022

(65) Prior Publication Data

US 2022/0407456 A1 Dec. 22, 2022

Related U.S. Application Data

(63) Continuation of application No. PCT/CN2020/109168, filed on Aug. 14, 2020.

(51) Int. Cl.
*H02S 50/10* (2014.01)
*H02S 40/32* (2014.01)

(52) U.S. Cl.
CPC .............. *H02S 50/10* (2014.12); *H02S 40/32* (2014.12)

(58) Field of Classification Search
CPC ....... H02J 2300/22; H02J 3/381; H02S 40/32; H02S 50/00; H02S 50/10; Y02E 10/50
See application file for complete search history.

(56) References Cited

U.S. PATENT DOCUMENTS

| 8,749,246 | B2 | 6/2014 | Schaefer | |
|---|---|---|---|---|
| 9,923,517 | B1 | 3/2018 | Wang et al. | |
| 2014/0360561 | A1* | 12/2014 | Meyer | F24S 25/13 136/251 |
| 2017/0353155 | A1* | 12/2017 | Hackl | H02S 50/00 |

(Continued)

FOREIGN PATENT DOCUMENTS

| CN | 103475271 A | 12/2013 |
|---|---|---|
| CN | 103701150 A | 4/2014 |

(Continued)

*Primary Examiner* — Neel D Shah
*Assistant Examiner* — Adam S Clarke
(74) *Attorney, Agent, or Firm* — Conley Rose, P.C.

(57) ABSTRACT

A linkage protection system includes an inverter, an anti-potential-induced degradation (PID) apparatus, and an insulation-monitoring apparatus. The anti-PID apparatus is configured to inject a voltage into an input end or an output end of the inverter, to increase or decrease a voltage-to-earth of a photovoltaic system. The insulation-monitoring apparatus is configured to inject an insulation-monitoring voltage into a direct current (DC) side or an alternating current (AC) side of the inverter. The anti-PID apparatus and the insulation-monitoring apparatus directly or indirectly communicate with each other, to learn of information about whether a peer apparatus is operating, and perform linkage control. The anti-PID apparatus and the insulation-monitoring apparatus operate in different time periods.

20 Claims, 17 Drawing Sheets

(56) References Cited

U.S. PATENT DOCUMENTS

| | | | |
|---|---|---|---|
| 2019/0393802 A1 | 12/2019 | Gao et al. | |
| 2020/0083715 A1* | 3/2020 | Yoscovich | H02J 3/381 |
| 2022/0268822 A1* | 8/2022 | Ju | G01R 31/52 |

FOREIGN PATENT DOCUMENTS

| | | | |
|---|---|---|---|
| CN | 107465389 A | 12/2017 | |
| CN | 107196597 B | 12/2019 | |
| CN | 110768626 A | 2/2020 | |
| CN | 106849167 B | 3/2020 | |
| WO | 2015015836 A1 | 2/2015 | |

* cited by examiner

LINKAGE PROTECTION SYSTEM AND METHOD FOR PHOTOVOLTAIC POWER STATION

CROSS-REFERENCE TO RELATED APPLICATIONS

This application is a continuation of International Patent Application No. PCT/CN2020/109168, filed on Aug. 14, 2020, the disclosure of which is hereby incorporated by reference in its entirety.

TECHNICAL FIELD

This application relates to the field of photovoltaic power generation technologies, and in particular, to a linkage protection system and method for a photovoltaic power station.

BACKGROUND

Currently, a photovoltaic power station is usually connected to a power grid, and photovoltaic power generation is fed back to the power grid. However, there are usually two problems in photovoltaic power generation, and the two problems are respectively a potential-induced degradation (PID) problem of a photovoltaic module and an insulation fault problem of a photovoltaic system. The following separately describes the two problems.

PID Problem.

Because a leakage current is generated due to a potential difference between a solar module glass layer and an encapsulated metal material, negative charges accumulate on a surface of a solar cell. Consequently, a surface passivation effect of the solar cell becomes poorer, and a related parameter such as a fill factor, a short-circuit current, or an open-circuit voltage is significantly reduced, to further reduce an output power of an entire photovoltaic power generation system.

Insulation Failure Problem.

Insulation performance deteriorates when a line encounters a factor such as a mechanical damage, a poor operating environment, and overload. If insulation performance of the photovoltaic system deteriorates to an extent, an insulation failure occurs in the photovoltaic system. For example, if the photovoltaic system suffers from a lightning overvoltage, a switching overvoltage, a line fault overvoltage, or the like, the photovoltaic system may be broken down or damaged, leading to a metal short circuit or an arcing short circuit, and damaging a safe operation of the photovoltaic system and personal safety.

Therefore, the photovoltaic power station may use an anti-PID module to avoid the PID problem of the photovoltaic module, and may further use an insulation-monitoring module to detect the insulation performance of the photovoltaic system, to give a warning when the insulation performance deteriorates to an extent. However, an existing photovoltaic power station is not configured with both the anti-PID module and the insulation-monitoring module, and consequently, the photovoltaic power station cannot overcome both the PID problem and the insulation fault problem.

SUMMARY

This application provides a linkage protection system and method for a photovoltaic power station, so that both an anti-PID module and an insulation-monitoring module can be configured in the photovoltaic power station, to overcome a PID problem and perform insulation-monitoring, so as to improve power generation efficiency of the photovoltaic power station and ensure safety of the photovoltaic power station.

According to a first aspect, this application provides a linkage protection system for a photovoltaic power station. The system includes both an anti-potential induced degradation PID module and an insulation-monitoring module. In other words, both an anti-PID function and insulation-monitoring can be realized. The anti-PID module and the insulation-monitoring module are controlled to alternately operate in different time periods. Therefore, the anti-PID module and the insulation-monitoring module do not affect each other and can coexist in a same photovoltaic power station. The anti-PID module is configured to inject a voltage into an input end or an output end of an inverter, to increase or decrease a voltage-to-earth of a photovoltaic system, so as to avoid a PID phenomenon. The insulation-monitoring module is configured to inject an insulation-monitoring voltage into a direct current (DC) side or an alternating current (AC) side of the inverter, to monitor an insulation fault of the system. The anti-PID module and the insulation-monitoring module communicate with each other and perform linkage control. In other words, the anti-PID module and the insulation-monitoring module do not separately control an operation, but learn of an operating state of a peer module, so that the anti-PID module and the insulation-monitoring module alternately operate in different time periods.

The anti-PID module and the insulation-monitoring module alternately operate in different time periods whereby the anti-PID module operates while the insulation-monitoring module does not operate in a time period, and the insulation-monitoring module operates while the anti-PID module does not operate in a next time period. The anti-PID module and the insulation-monitoring module alternately operate in different time periods, to prevent the anti-PID module and the insulation-monitoring module from simultaneously operating, prevent the voltage injected by the anti-PID module from being detected by the insulation-monitoring module, and prevent the insulation-monitoring module from frequently giving a false alarm to the photovoltaic power station. In addition, when the insulation-monitoring module gives an alarm that an associated box-type substation is tripped, a phenomenon that an AC of an entire photovoltaic array fails when the insulation-monitoring module directly opens a main switch on a transformer side may be avoided.

The anti-PID module and the insulation-monitoring module of the linkage protection system for a photovoltaic power station directly or indirectly communicate with each other, to learn of information about whether the peer module is operating, and perform linkage control, so that the anti-PID module and the insulation-monitoring module alternately operate in different time periods. In an example, the anti-PID module operates while the insulation-monitoring module does not operate in a time period, and the insulation-monitoring module operates while the anti-PID module does not operate in another time period. Because the anti-PID module and the insulation-monitoring module alternately operate in different time periods, the anti-PID module and the insulation-monitoring module do not operate in a same time period, to avoid a problem that the insulation-monitoring module gives an abnormal insulation alarm when a voltage injected when the anti-PID module operates is detected by the insulation-monitoring module. In addition, the system may realize the anti-PID function and detect an insulation fault, to avoid PID of a photovoltaic module and monitor an insulation fault of the photovoltaic system, so as to improve power generation efficiency of the photovoltaic power station and ensure safety of the photovoltaic power station.

Optionally, this application provides two manners in which the anti-PID module and the insulation-monitoring module communicate with each other. A first manner is that the anti-PID module and the insulation-monitoring module directly or indirectly communicate by using a Modbus Protocol. A second manner is that the anti-PID module and the insulation-monitoring module directly or indirectly communicate by using a dry contact. That the anti-PID module and the insulation-monitoring module directly or indirectly communicate by using a dry contact is described below in two cases.

In a first case, the anti-PID module and the insulation-monitoring module directly communicate by using the dry contact. The anti-PID module includes a first dry contact, the insulation-monitoring module includes a second dry contact, and the first dry contact and the second dry contact are connected.

Optionally, when the anti-PID module and the insulation-monitoring module directly communicate by using the dry contact, the anti-PID module may be used as a main control module. In an example, the first dry contact is a digital output (DO) contact, and the second dry contact is a digital input (DI) contact. The anti-PID module is configured to control the DO contact to be in a first state, so that the insulation-monitoring module monitors a status of the DI contact to stop operating, and is further configured to control the DO contact to be in a second state, so that the insulation-monitoring module monitors the status of the DI contact to start operating. The first state and the second state are different states.

Optionally, when the anti-PID module and the insulation-monitoring module directly communicate by using the dry contact, the insulation-monitoring module may be used as a main control module. In an example, the first dry contact is a digital input (DI) contact, and the second dry contact is a digital output (DO) contact. The insulation-monitoring module is configured to control the DO contact to be in a first state, so that the anti-PID module monitors a status of the DI contact to stop operating, and is further configured to control the DO contact to be in a second state, so that the anti-PID module monitors the status of the DI contact to start operating. The first state and the second state are different states.

In a second case, the anti-PID module and the insulation-monitoring module indirectly communicate by using the dry contact. The linkage protection system for a photovoltaic power station further includes a data collection apparatus. The data collection apparatus communicates with the anti-PID module; and the data collection apparatus includes a first dry contact, the insulation-monitoring module includes a second dry contact, and the first dry contact and the second dry contact are connected.

Optionally, when the anti-PID module and the insulation-monitoring module indirectly communicate by using the dry contact, the data collection apparatus may be used as a main control module. In an example, the first dry contact is a digital output DO contact, and the second dry contact is a digital input DI contact. The data collection apparatus is configured to control the DO contact to be in a first state, so that the insulation-monitoring module monitors a status of the DI contact to stop operating, and is further configured to control the DO contact to be in a second state, so that the insulation-monitoring module monitors the status of the DI contact to start operating. The first state and the second state are different states.

Optionally, when the anti-PID module and the insulation-monitoring module indirectly communicate by using the dry contact, the insulation-monitoring module may be used as a main control module. In an example, the first dry contact is a digital input DI contact, and the second dry contact is a digital output DO contact. The insulation-monitoring module is configured to control the DO contact to be in a first state, so that the data collection apparatus notifies, by monitoring a status of the DI contact, the anti-PID module to stop operating, and is further configured to control the DO contact to be in a second state, so that the data collection apparatus notifies, by monitoring the status of the DI contact, the anti-PID module to start operating. The first state and the second state are different states.

Optionally, when the anti-PID module is independent of the inverter, if the protection system includes a plurality of inverters, output ends of the plurality of inverters are connected in parallel, and the plurality of inverters share a same anti-PID module.

Optionally, the anti-PID module may not only be located outside the inverter, but also may be located inside the inverter.

Optionally, when the anti-PID module is located inside the inverter, if the protection system includes a plurality of inverters, output ends of the plurality of inverters are connected in parallel, one anti-PID module is disposed inside each inverter, an anti-PID module disposed inside one inverter communicates with the insulation-monitoring module, and anti-PID modules corresponding to all the inverters synchronously start operating or synchronously stop operating.

Optionally, the foregoing describes a deployment manner of the linkage protection system for a photovoltaic power station in the photovoltaic system. The following describes a deployment manner of a linkage protection system for a photovoltaic power station in a photovoltaic energy storage system. The photovoltaic energy storage system includes a photovoltaic energy storage DC coupling system and a photovoltaic energy storage AC coupling system. The following describes the deployment manner of the linkage protection system for a photovoltaic power station in two cases.

A first case is the photovoltaic energy storage DC coupling system. The linkage protection system for a photovoltaic power station further includes a DC-DC converter and a battery. A first end of the DC-DC converter is connected to a DC side of the inverter, and a second end of the DC-DC converter is connected to the battery; and the insulation-monitoring module is integrated inside the DC-DC converter.

A second case is the photovoltaic energy storage AC coupling system. The linkage protection system for a photovoltaic power station further includes a battery, a DC-DC converter, and a power conversion system. A first end of the power conversion system is connected to an AC side of the inverter, a second end of the power conversion system is connected to a first end of the DC-DC converter, and a second end of the DC-DC converter is connected to the battery. The insulation-monitoring module includes a first insulation-monitoring module and a second insulation-monitoring module. The first insulation-monitoring module is disposed inside the DC-DC converter, and the second insulation-monitoring module is disposed inside the power conversion system. A dry contact of the DC-DC converter and a dry contact of the power conversion system communicate by using a dry contact, and when the anti-PID module stops operating, one of the first insulation-monitoring module and the second insulation-monitoring module starts operating.

Optionally, the anti-PID module is further configured to perform insulation-monitoring when operating, stop operating when monitored insulation impedance is less than a first preset value, and indicate the insulation-monitoring module to start operating to perform insulation-monitoring.

According to a second aspect, this application provides a linkage protection method for a photovoltaic power station. The method is applied to a photovoltaic system, and the photovoltaic system includes an inverter, an anti-potential induced degradation PID module, and an insulation-monitoring module. The method includes controlling the anti-PID module and the insulation-monitoring module to communicate with each other and perform linkage control, so that the anti-PID module and the insulation-monitoring module alternately operate in different time periods; when the anti-PID module operates, controlling the anti-PID module to inject a voltage into an input end or an output end of the inverter, to increase or decrease a voltage-to-earth of the photovoltaic system; and when the insulation-monitoring module operates, controlling the insulation-monitoring module to inject an insulation-monitoring voltage into a DC side or an AC side of the inverter.

Optionally, the anti-PID module and the insulation-monitoring module alternately operate in different time periods whereby the anti-PID module operates while the insulation-monitoring module does not operate in a time period, and the insulation-monitoring module operates while the anti-PID module does not operate in a next time period. The anti-PID module and the insulation-monitoring module alternately operate in different time periods, to prevent the anti-PID module and the insulation-monitoring module from simultaneously operating, prevent the voltage injected by the anti-PID module from being detected by the insulation-monitoring module, and prevent the insulation-monitoring module from frequently giving a false alarm to the photovoltaic power station. In addition, when the insulation-monitoring module gives an alarm that an associated box-type substation is tripped, a phenomenon that an AC of an entire photovoltaic array fails when the insulation-monitoring module directly opens a main switch on a transformer side may be avoided.

Optionally, this application provides two manners in which the anti-PID module and the insulation-monitoring module communicate with each other. A first manner is that the anti-PID module and the insulation-monitoring module directly or indirectly communicate by using Modbus Protocol. A second manner is that the anti-PID module and the insulation-monitoring module directly or indirectly communicate by using a dry contact.

According to the foregoing technical solutions, it can be learned that the embodiments of this application have the following advantages.

The linkage protection system for a photovoltaic power station includes both the anti-PID module and the insulation-monitoring module. The anti-PID module and the insulation-monitoring module directly or indirectly communicate with each other, to obtain the information about whether the peer module is operating, so that the anti-PID module and the insulation-monitoring module operate in different time periods. In an example, the insulation-monitoring module does not operate when the anti-PID module operates; and the anti-PID module does not operate when the insulation-monitoring module operates. When operating, the anti-PID module is configured to inject the voltage into the input end or the output end of the inverter, to increase or decrease the voltage-to-earth of the photovoltaic system, to avoid a PID phenomenon. When operating, the insulation-monitoring module is configured to inject the insulation-monitoring voltage into the DC side or the AC side of the inverter, to monitor the insulation fault of the system. The anti-PID module and the insulation-monitoring module operate in different time periods, to avoid the problem that the insulation-monitoring module gives an abnormal insulation alarm when a voltage injected when the anti-PID module operates is detected by the insulation-monitoring module. In addition, the system may realize the anti-PID function and detect the insulation fault, to avoid the PID of the photovoltaic module and monitor the insulation fault of the photovoltaic system, so as to improve the power generation efficiency of the photovoltaic power station and ensure the safety of the photovoltaic power station.

DESCRIPTION OF EMBODIMENTS

To make a person skilled in the art better understand technical solutions provided in embodiments of this application, the following first describes a reason why an anti-PID module and an insulation-monitoring module are not both configured in a photovoltaic power station.

Figure 1:
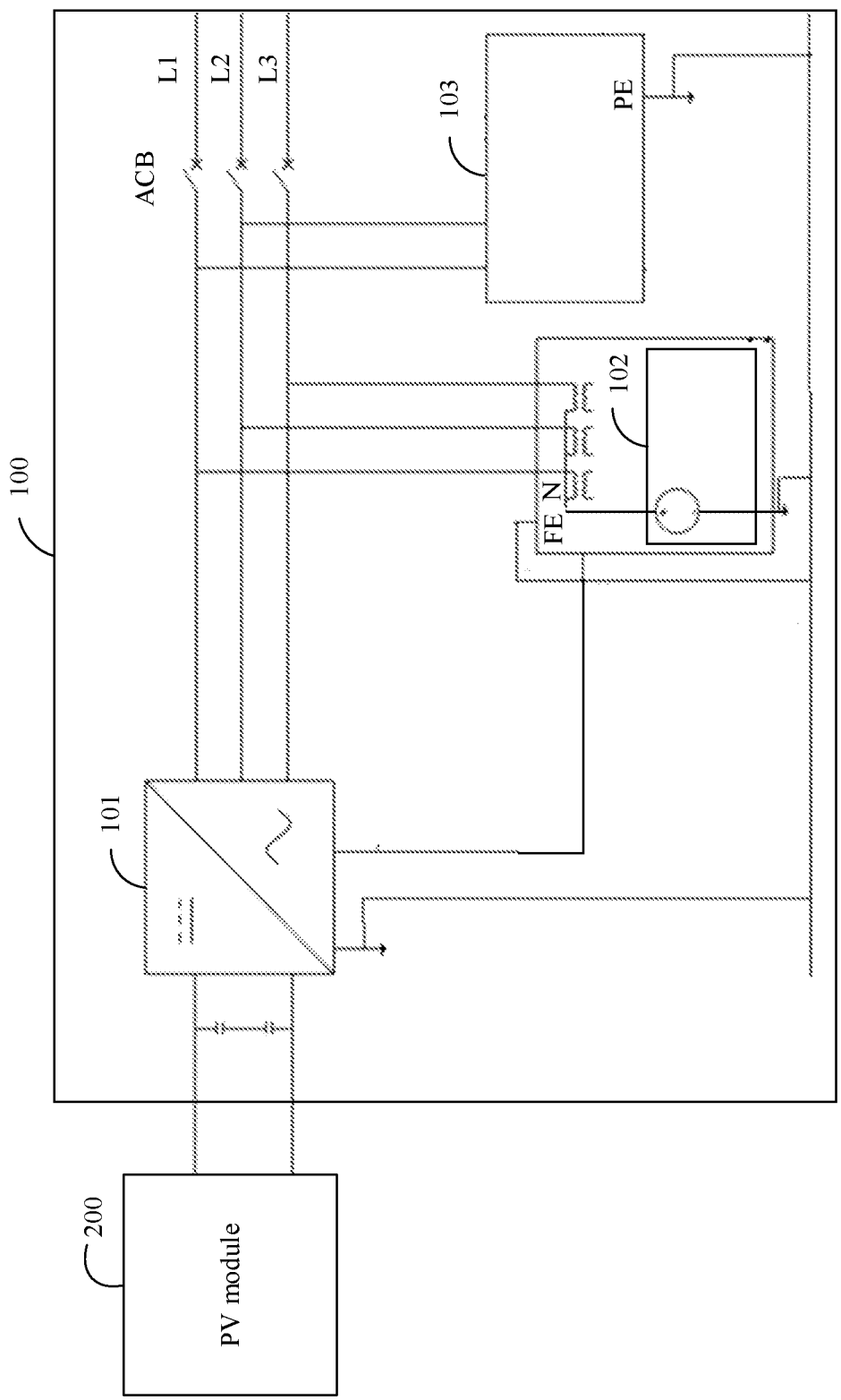
FIG. 1 is a schematic diagram of a linkage protection system for a photovoltaic power station according to an embodiment of this application.

FIG. 1 is a schematic diagram of a linkage protection system for a photovoltaic power station according to an embodiment of this application.

A linkage protection system 100 for a photovoltaic power station is connected to a photovoltaic (PV) module 200, and the linkage protection system 100 for a photovoltaic power station includes an inverter 101, an anti-PID module 102, and an insulation-monitoring module 103.

A specific connection location of the anti-PID module 102 and the insulation-monitoring module 103 is not limited in this application. The anti-PID module 102 and the insulation-monitoring module 103 may be connected to an AC side of the inverter 101, or may be connected to a DC side of the inverter 101. In this embodiment, that the anti-PID module 102 and the insulation-monitoring module 103 are connected to the AC side of the inverter 101 is used as an example for description.

The following separately describes a function of the anti-PID module 102 and a function of the insulation-monitoring module 103.

1. Anti-PID Module

The anti-PID module 102 injects a DC voltage into an output end of the inverter 101, so that a DC end of the PV module 200 may adjust, based on a requirement, a voltage of PV− to a value greater than zero, or adjust, based on a requirement, PV+ to a value less than zero, in other words, to increase or decrease a voltage-to-earth of a photovoltaic system, to avoid a PID problem of the photovoltaic module.

2. Insulation-Monitoring Module

The insulation-monitoring module 103 injects a voltage-to-earth with a specific frequency and amplitude into two phases, to detect a current flowing through an internal resistor, so that the system detects earth insulation impedance. When the insulation impedance is greater than a preset value, it indicates that insulation of the system is normal, and no insulation fault occurs; or when the insulation impedance is not greater than a preset value, it is determined that an insulation fault occurs in the system.

If both the anti-PID module 102 and the insulation-monitoring module 103 are configured in the photovoltaic power station, after the anti-PID module 102 in the photovoltaic power station injects the voltage into the output end of the inverter 101, the injected voltage is detected by the insulation-monitoring module 103 by using a common earth leakage circuit. Consequently, an earth leakage current detected by the insulation-monitoring module 103 is too large, so that the insulation-monitoring module 103 mistakenly considers that an insulation fault problem occurs in the photovoltaic system, and further reports an insulation fault alarm to the photovoltaic power station. Especially, when the insulation-monitoring module 103 gives an alarm that an associated box-type substation is tripped, the insulation-monitoring module 103 directly opens a main switch on a transformer side, and consequently, an AC of an entire photovoltaic array fails.

Therefore, if the anti-PID module 102 and the insulation-monitoring module 103 operate simultaneously, the voltage injected by the anti-PID module 102 is detected by the insulation-monitoring module 103, and consequently, the insulation-monitoring module 103 frequently gives a false alarm to the photovoltaic power station. Based on this, the photovoltaic power station is usually not configured with both the anti-PID module 102 and the insulation-monitoring module 103. Consequently, the photovoltaic power station cannot implement anti-PID and detect the insulation fault.

Therefore, this application provides a linkage protection system and method for a photovoltaic power station, so that both an anti-PID module and an insulation-monitoring module are configured in the photovoltaic power station, to overcome both a PID problem and an insulation fault problem, in other words, to have both a function of avoiding PID of a photovoltaic module and an earth insulation-monitoring function of the system.

To make a person skilled in the art better understand the technical solutions provided in the embodiments of this application, the following clearly and completely describes the technical solutions in the embodiments of the present disclosure with reference to the accompanying drawings in the embodiments of the present disclosure.

Embodiment 1 of a linkage protection system for a photovoltaic power station.

Figure 2:
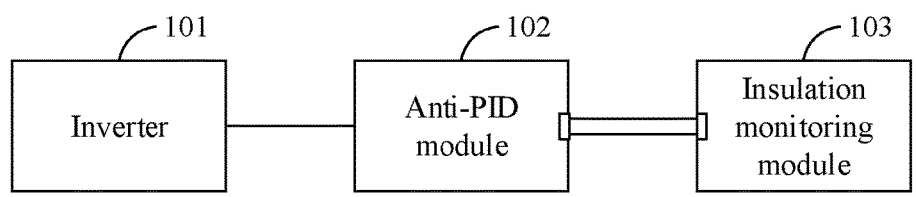
FIG. 2 is a schematic diagram of another linkage protection system for a photovoltaic power station according to an embodiment of this application.

FIG. 2 is a schematic diagram of another linkage protection system for a photovoltaic power station according to an embodiment of this application.

The photovoltaic power station may be a small-sized power station, or may be a large-sized power station, and a corresponding power generation power may be large or small, and a technical solution provided in this embodiment of this application may be used. There may be one or more inverters in the photovoltaic power station, and a quantity of inverters is not limited. For ease of description, one inverter is used as an example for description.

The linkage protection system for a photovoltaic power station includes an inverter 101, an anti-PID module 102, and an insulation-monitoring module 103.

When operating, the anti-PID module 102 is configured to inject a voltage into an input end or an output end of the inverter 101, to increase or decrease a voltage-to-earth of a photovoltaic system. Anti-PID aims to increase an energy yield of photovoltaic power generation.

Continue to refer to FIG. 1. The anti-PID module 102 is connected to a three-phase alternating grid (L1, L2, or L3) and a functional earth (FE).

When operating, the anti-PID module 102 injects a voltage between a phase wire and a ground cable in an inductive coupling manner or a semiconductor coupling manner, to adjust a voltage-to-earth of a photovoltaic module 200 PV+ or a voltage-to-earth of a photovoltaic module 200 PV−, until the voltage-to-earth of the photovoltaic module 200 PV+ is less than or equal to zero, or the voltage-to-earth of the photovoltaic module 200 PV− is greater than or equal to zero. When the anti-PID module 102 operates, the voltage-to-earth of the photovoltaic system is increased or decreased based on different photovoltaic module process types, to avoid a PID problem of a photovoltaic module.

A location at which the anti-PID module 102 injects a voltage is not limited in this embodiment of this application. For example, the anti-PID module 102 may inject a voltage into the input end (a DC side) of the inverter 101, or may inject a voltage into the output end (an AC) side of the inverter 101.

A manner of coupling a PID module and a power grid is not limited in this embodiment of this application, and may be any one of the following such as inductive coupling, resistive coupling, capacitive coupling, or semiconductor device coupling.

When operating, the insulation-monitoring module 203 is configured to inject an insulation-monitoring voltage into the DC side or the alternating current side of the inverter 101.

Continue to refer to FIG. 1. The insulation-monitoring module 203 is connected to a PE and two phases of the three-phase alternating grid, for example, L1 and L2.

When operating, the insulation-monitoring module 203 injects an insulation-monitoring voltage between a ground cable and two phase wires, to detect a current of an internal resistor of the insulation-monitoring module 203, so as to detect earth impedance.

A location at which the insulation-monitoring module 203 injects a voltage is not limited in this embodiment of this application. For example, the insulation-monitoring module 203 may inject a voltage into the DC side of the inverter 101, or may inject a voltage into the AC side of the inverter 101.

The anti-PID module 102 and the insulation-monitoring module 103 communicate with each other, obtain information about an operating state of a peer module through direct communication or indirect communication, for example, information indicating that the peer module operates or information indicating that the peer module does not operate, and perform linkage control based on the operating states of the anti-PID module 102 and the insulation-monitoring module 103, so that the anti-PID module 102 and the insulation-monitoring module 103 alternately operate in different time periods. In an example, the anti-PID module 102 operates while the insulation-monitoring module 103 does not operate in a time period, and the insulation-monitoring module 103 operates while the anti-PID module 102 does not operate in another time period. For example, in a time period, when the anti-PID module 102 operates, the insulation-monitoring module 103 does not operate, and in a next time period, when the insulation-monitoring module 103 operates, the anti-PID module 102 does not operate.

Whether the anti-PID module 102 and the insulation-monitoring module 103 alternately operate continuously is not limited in this embodiment of this application. For example, the insulation-monitoring module 103 operates immediately after the PID module 102 stops operating. For another example, after the PID module 102 stops operating, and a preset delay time period passes, the insulation-monitoring module 103 starts operating. For still another example, in daytime, the PID module 102 and the insulation-monitoring module 103 operate in a complementary manner. In an example, the insulation-monitoring module 103 does not operate when the PID module 102 operates, and the insulation-monitoring module 103 operates when the PID module 102 does not operate. At night, the PID module 102 does not operate, and the insulation-monitoring module 103 operates. In other words, an operating time period of the anti-PID module 102 does not overlap an operating time period of the insulation-monitoring module 103.

A quantity of anti-PID modules 102 in the linkage protection system for a photovoltaic power station is not limited in this embodiment of this application, and there may be one or more anti-PID modules 102.

For example, in a dual-winding transformer scenario, one anti-PID module is configured, and a plurality of inverters connected to one transformer winding in parallel share one anti-PID module. For another example, in a dual-split transformer scenario, two anti-PID modules are configured, and inverters connected to a same transformer winding in parallel share one anti-PID module. When the anti-PID module is integrated inside the inverter, a quantity of anti-PID modules may be the same as a quantity of inverters.

The anti-PID module and the insulation-monitoring module are usually located at a low-voltage location of a transformer.

A communication manner between the anti-PID module 102 and the insulation-monitoring module 103 is not limited in this embodiment of this application. For example, the anti-PID module 102 and the insulation-monitoring module 103 communicate by using Modbus Protocol. For another example, the anti-PID module 102 and the insulation-monitoring module 103 communicate by using a dry contact.

Whether the anti-PID module 102 and the insulation-monitoring module 103 directly communicate or indirectly communicate is not limited in this embodiment of this application. For example, the anti-PID module 102 and the insulation-monitoring module 103 directly communicate by using Modbus Protocol, or the anti-PID module 102 and the insulation-monitoring module 103 indirectly communicate by using Modbus Protocol. For another example, the anti-PID module 102 and the insulation-monitoring module 103 directly communicate by using the dry contact, or the anti-PID module 102 and the insulation-monitoring module 103 indirectly communicate by using the dry contact.

This embodiment provides the linkage protection system for a photovoltaic power station. Both the anti-PID module and the insulation-monitoring module are configured in the system, and the anti-PID module and the insulation-monitoring module can obtain, through direct or indirect communication, information about whether the peer module is operating. Therefore, the anti-PID module and the insulation-monitoring module can operate in different time periods. In an example, the insulation-monitoring module does not operate when the anti-PID module operates; and the anti-PID module does not operate when the insulation-monitoring module operates. When operating, the anti-PID module is configured to inject the voltage into the input end or the output end of the inverter, to increase or decrease the voltage-to-earth of the photovoltaic system. When operating, the insulation-monitoring module is configured to inject the insulation-monitoring voltage into the DC side or the AC side of the inverter. The anti-PID module and the insulation-monitoring module operate in different time periods, to avoid a problem that the insulation-monitoring module gives an abnormal insulation alarm when a voltage injected when the anti-PID module operates is detected by the insulation-monitoring module. In addition, the system overcomes both the PID problem and an insulation fault problem, to not only avoid PID of the photovoltaic module, but also detect insulation performance of the photovoltaic system, so as to ensure that the photovoltaic power station continuously and reliably runs.

Embodiment 2 of a linkage protection system for a photovoltaic power station.

A case in which an anti-PID module and an insulation-monitoring module directly communicate by using a dry contact and a case in which an anti-PID module and an insulation-monitoring module indirectly communicate by using a dry contact are respectively described by using Embodiment 2 of a linkage protection system for a photovoltaic power station and Embodiment 3 of a linkage protection system for a photovoltaic power station.

In this embodiment, the case in which the anti-PID module and the insulation-monitoring module directly communicate by using a dry contact is described.

A location at which the anti-PID module is configured is not limited in this embodiment of this application. For example, the anti-PID module may be independent of an inverter, and is disposed independently, or may be built into an inverter. The following provides descriptions with reference to FIG. 2 and FIG. 5.

Continue to refer to FIG. 2. In this embodiment, an anti-PID module 102 is independent of an inverter 101, and the anti-PID module 102 and an insulation-monitoring module 103 directly communicate.

A quantity of inverters in the linkage protection system for a photovoltaic power station is not limited in this embodiment of this application. For example, the linkage protection system for a photovoltaic power station includes n inverters, where n is an integer greater than 0. When n=1, reference is made to the embodiment shown in FIG. 2. When n is greater than 1, reference is made to the embodiment shown in FIG. 3.

Figure 3:
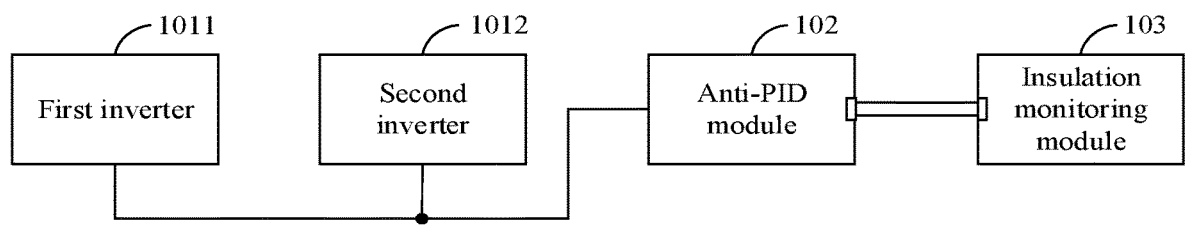
FIG. 3 is a schematic diagram of still another linkage protection system for a photovoltaic power station according to an embodiment of this application.

FIG. 3 is a schematic diagram of still another linkage protection system for a photovoltaic power station according to an embodiment of this application.

In this embodiment, there are n inverters, and output ends of the n inverters are connected in parallel, and share a same anti-PID module 102. For ease of description, n=2 is used as an example for description.

As shown in FIG. 3, an output end of a first inverter 1011 and an output end of a second inverter 1012 are connected in parallel. The first inverter 1011 and the second inverter 1012 are connected in parallel and share a same anti-PID module 102, and the anti-PID module 102 and the insulation-monitoring module 103 directly communicate.

Figure 4:
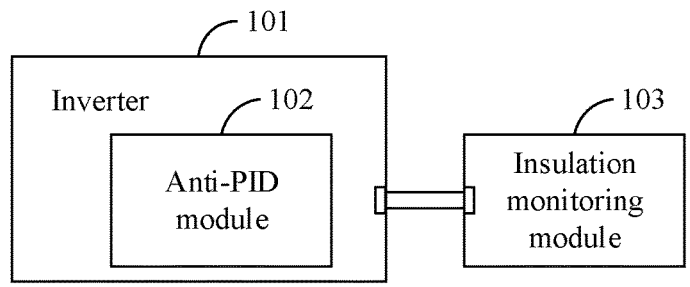
FIG. 4 is a schematic diagram of yet another linkage protection system for a photovoltaic power station according to an embodiment of this application.

In the embodiments shown in FIG. 2 and FIG. 3, the anti-PID module is independent of the inverter. The following describes, with reference to FIG. 4 and FIG. 5, a case in which the anti-PID module is built into the inverter. In FIG. 4, that there is one inverter is used as an example, and in FIG. 5, that there is more than one inverter is used as an example.

FIG. 4 is a schematic diagram of yet another linkage protection system for a photovoltaic power station according to an embodiment of this application.

In this embodiment, an anti-PID module 102 is built into an inverter 101, and the inverter 101 and an insulation-monitoring module 103 directly communicate, to control the anti-PID module 102 and the insulation-monitoring module 103 to operate in different time periods.

Figure 5:
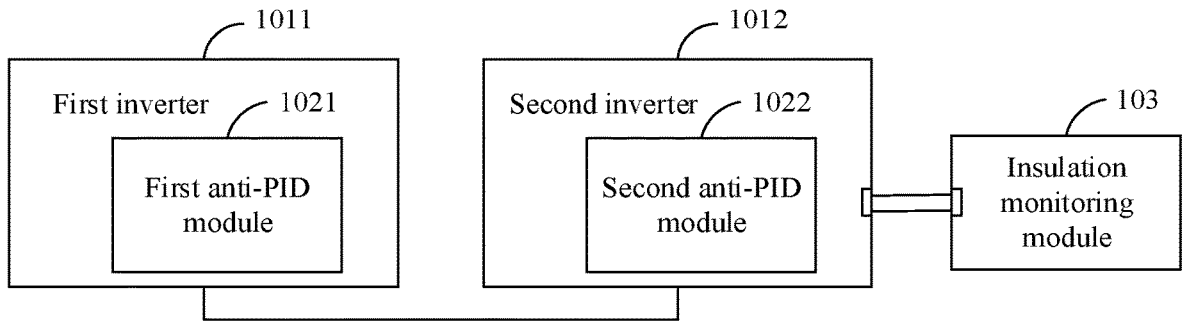
FIG. 5 is a schematic diagram of another linkage protection system for a photovoltaic power station according to an embodiment of this application.

FIG. 5 is a schematic diagram of another linkage protection system for a photovoltaic power station according to an embodiment of this application.

In this embodiment, there are n inverters, and one anti-PID module is built into each inverter. One of n anti-PID modules directly communicates with an insulation-monitoring module 103. For ease of description, n=2 is used as an example for description.

As shown in FIG. 5, a first anti-PID module 1021 is built into a first inverter 1011, and a second anti-PID module 1022 is built into a second inverter 1012. The second anti-PID module 1022 and the insulation-monitoring module 103 communicate.

All operating states of the anti-PID module are not limited in this embodiment of this application. For example, anti-PID modules corresponding to all inverters synchronously start operating or synchronously stop operating. For another example, some anti-PID modules start operating first, and the remaining anti-PID modules start operating later. For still another example, some anti-PID modules start operating first, some anti-PID modules start operating later, and the remaining anti-PID modules do not operate.

It should be noted that, the anti-PID module and the insulation-monitoring module operate in different time periods, and all operating states of the anti-PID module and the insulation-monitoring module fall within the protection scope of this embodiment of this application.

A case in which an anti-PID module 102 and the insulation-monitoring module 103 directly communicate by using a dry contact is described below with reference to FIG. 2.

The anti-PID module 102 and the insulation-monitoring module 103 directly communicate by using the dry contact. The dry contact includes a first dry contact and a second dry contact, and the first dry contact and the second dry contact are respectively located in the anti-PID module 102 and the insulation-monitoring module 103. For example, the anti-PID module 102 includes the first dry contact, and the insulation-monitoring module 103 includes the second dry contact. The first dry contact and the second dry contact are connected, so that the anti-PID module 102 and the insulation-monitoring module 103 communicate.

The dry contact has two polarities, and the two polarities are respectively a DO and a DI. Because polarities of the two dry contacts of the dry contact are not limited, and may be changed, there are two polarity combinations of the first dry contact and the second dry contact, and the two polarity combinations are respectively as follows. In a first polarity combination, the first dry contact is a DO contact, and the second dry contact is a DI contact. In a second polarity combination, the first dry contact is a DI contact, and the second dry contact is a DO contact. The following separately describes the two polarity combinations.

In the first polarity combination, the first dry contact is a DO contact, and the second dry contact is a DI contact.

The anti-PID module 102 controls the DO contact to be in a first state, so that the insulation-monitoring module 103 monitors a status of the DI contact to stop operating. Similarly, the anti-PID module 102 further controls the DO contact to be in a second state, so that the insulation-monitoring module 103 monitors the status of the DI contact to start operating.

When the first dry contact included in the anti-PID module 102 is a DO contact, and the second dry contact included in the insulation-monitoring module 103 is a DI contact, the anti-PID module 102 is used as a control body of the dry contact. The anti-PID module 102 controls a status of the DO contact based on an operating state of the anti-PID module 102. Therefore, the insulation-monitoring module 103 adjusts an operating state, so that the anti-PID module 102 and the insulation-monitoring module 103 operate in different time periods.

The anti-PID module 102 continuously controls the status of the DO contact, so that the anti-PID module 102 and the insulation-monitoring module 103 operate in different time periods.

A manner in which the anti-PID module 102 controls the DO contact is not limited in this embodiment of this application. For example, a periodic instruction is preset in the anti-PID module 102. After the anti-PID module 102 prepares to start operating, the anti-PID module 102 controls the DO contact to be in the first state, so that the insulation-monitoring module 103 monitors the status of the DI contact to stop operating. Then, after the insulation-monitoring module 103 stops operating, the anti-PID module 102 operates for a first time period. Next, the anti-PID module 102 stops operating, the DO contact is controlled to be in the second state, so that the insulation-monitoring module 103 monitors the status of the DI contact to start operating, and operates for the second time period. This cycle is repeated, and the anti-PID module 102 continuously controls the status of the DO contact, so that the anti-PID module 102 and the insulation-monitoring module 103 operate in different time periods.

Lengths of the first time period and the second time period are not limited in this embodiment of this application. A person skilled in the art may set the lengths based on an actual requirement. For example, the first time period is 60 minutes, and the second period is 15 minutes.

For another example, in this embodiment of this application, the anti-PID module 102 is further configured to perform insulation-monitoring when operating, stop operating when monitored insulation impedance is less than a first preset value, and indicate the insulation-monitoring module 103 to start operating to perform insulation-monitoring.

The first preset value is not limited in this embodiment of this application. A person skilled in the art may set the first preset value based on an actual requirement. For example, the first preset value may be set to be higher than a threshold of the insulation-monitoring module 103, so that after the anti-PID module 102 stops operating, the insulation-monitoring module 103 can continue to perform monitoring in a timely manner.

The dry contact has two states such as a closed state and an open state. Corresponding to the first state and the second state, the first state and the second state are two different states. The DO contact is used as an example. There are two cases, and the two cases are respectively as follows. Case 1: The first state is a closed state, and the second state is an open state. Case 2: The first state is an open state, and the second state is a closed state. The following separately describes the two cases.

Case 1: The first state is a closed state, and the second state is an open state.

When the anti-PID module 102 prepares to start operating, the DO contact is controlled to be in the first state, namely, the closed state. If the insulation-monitoring module 103 learns, based on the DI contact, that the DO contact is in a closed state, the insulation-monitoring module 103 stops operating, so that the anti-PID module 102 starts operating. Therefore, the anti-PID module 102 and the insulation-monitoring module 103 operate in different time periods.

After the anti-PID module 102 stops operating, the DO contact is controlled to be in the second state, namely, the open state. If the insulation-monitoring module 103 learns, based on the DI contact, that the DO contact is in an open state, the insulation-monitoring module 103 starts operating. Therefore, the anti-PID module 102 and the insulation-monitoring module 103 operate in different time periods.

Case 2: The first state is an open state, and the second state is a closed state.

When the anti-PID module 102 prepares to start operating, the DO contact is controlled to be in the first state, namely, the open state. If the insulation-monitoring module 103 learns, based on the DI contact, that the DO contact is in an open state, the insulation-monitoring module 103 stops operating, so that the anti-PID module 102 starts operating. Therefore, the anti-PID module 102 and the insulation-monitoring module 103 operate in different time periods.

After the anti-PID module 102 stops operating, the DO contact is controlled to be in the second state, namely, the closed state. If the insulation-monitoring module 103 learns, based on the DI contact, that the DO contact is in a closed state, the insulation-monitoring module 103 starts operating. Therefore, the anti-PID module 102 and the insulation-monitoring module 103 operate in different time periods.

In the second polarity combination, the first dry contact is a DI contact, and the second dry contact is a DO contact.

The insulation-monitoring module 103 controls the DO contact to be in the first state, so that the anti-PID module 102 monitors the status of the DI contact to stop operating. The insulation-monitoring module 103 further controls the DO contact to be in the second state, so that the anti-PID module 102 monitors the status of the DI contact to start operating.

When the first dry contact included in the anti-PID module 102 is a DI contact, and the second dry contact included in the insulation-monitoring module 103 is a DO contact, the insulation-monitoring module 103 is used as a control body of the dry contact. The insulation-monitoring module 103 controls a status of the DO contact based on an operating state of the insulation-monitoring module 103. Therefore, the anti-PID module 102 adjusts an operating state, so that the anti-PID module 102 and the insulation-monitoring module 103 operate in different time periods.

The insulation-monitoring module 103 continuously controls the status of the DO contact, so that the anti-PID module 102 and the insulation-monitoring module 103 operate in different time periods.

A manner in which the insulation-monitoring module 103 controls the DO contact is not limited in this embodiment of this application. For example, a periodic instruction is preset in the insulation-monitoring module 103. After the insulation-monitoring module 103 prepares to start operating, the DO contact is controlled to be in the first state, so that the anti-PID module 102 monitors the status of the DI contact to stop operating. Then, after the anti-PID module 102 stops operating, the insulation-monitoring module 103 operates for a first time period. Next, the insulation-monitoring module 103 stops operating, the DO contact is controlled to be in the second state, so that the insulation anti-PID module 102 monitors the status of the DI contact to start operating, and operates for a second time period. This cycle is repeated, and the insulation-monitoring module 103 continuously controls the status of the DO contact, so that the anti-PID module 102 and the insulation-monitoring module 103 operate in different time periods.

Lengths of the first time period and the second time period are not limited in this embodiment of this application. A person skilled in the art may set the lengths based on an actual requirement. For example, the first time period is 15 minutes, and the second period is 60 minutes.

Similarly, the dry contact has two states. The DO contact is used as an example. There are two cases, and the two cases are respectively as follows. Case 1: The first state is a closed state, and the second state is an open state. Case 2: The first state is an open state, and the second state is a closed state. The two cases of the second polarity combination are basically similar to the two cases of the first polarity combination, and a difference is that control bodies of the dry contact are different. The control body of the first polarity combination is the anti-PID module 102, and the control body of the second polarity combination is the insulation-monitoring module 103.

This embodiment provides the linkage protection system for a photovoltaic power station. The system is a photovoltaic system, and includes both the anti-PID module and the insulation-monitoring module. The anti-PID module and the insulation-monitoring module directly communicate, to obtain information about whether a peer module operates, so that the anti-PID module and the insulation-monitoring module operate in different time periods. In an example, the insulation-monitoring module does not operate when the anti-PID module operates; and the anti-PID module does not operate when the insulation-monitoring module operates. When operating, the anti-PID module is configured to inject a voltage into an input end or an output end of the inverter, to increase or decrease a voltage-to-earth of the photovoltaic system. When operating, the insulation-monitoring module is configured to inject an insulation-monitoring voltage into a DC side or an AC side of the inverter. The anti-PID module and the insulation-monitoring module operate in different time periods, to avoid a problem that the insulation-monitoring module gives an abnormal insulation alarm when a voltage injected when the anti-PID module operates is detected by the insulation-monitoring module. In addition, the system may realize an anti-PID function and detect an insulation fault, to not only avoid PID of a photovoltaic module, but also detect insulation performance of the photovoltaic system, so as to ensure that a photovoltaic power station continuously and reliably runs.

Embodiment 3 of a linkage protection system for a photovoltaic power station.

In this embodiment, a case in which an anti-PID module and an insulation-monitoring module indirectly communicate by using a dry contact is described.

An intermediate apparatus between the anti-PID module and the insulation-monitoring module is not limited in this embodiment of this application. A person skilled in the art may set the intermediate apparatus based on an actual requirement.

For ease of description, that the intermediate apparatus is a data collection apparatus is used for description below.

The data collection apparatus provides a function such as interface convergence, protocol conversion, data collection, data storage, centralized monitoring, or centralized maintenance for each device such as an inverter, PID, an insulation-monitoring apparatus, an environmental monitoring instrument, or a box-type substation of the linkage protection system for a photovoltaic power station.

Figure 6:
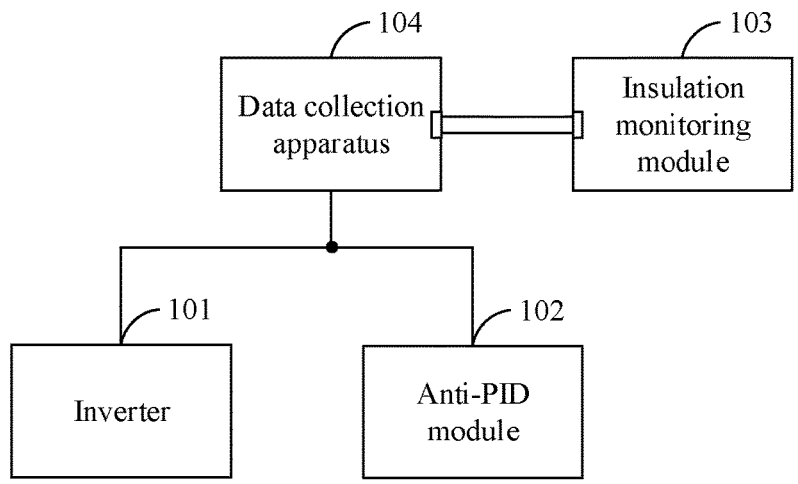
FIG. 6 is a schematic diagram of still another linkage protection system for a photovoltaic power station according to an embodiment of this application.

FIG. 6 is a schematic diagram of still another linkage protection system for a photovoltaic power station according to an embodiment of this application.

The linkage protection system for a photovoltaic power station includes an inverter 101, an anti-PID module 102, an insulation-monitoring module 103, and a data collection apparatus 104.

For descriptions of the inverter 101, the anti-PID module 102, and the insulation-monitoring module 103, refer to the embodiment shown in FIG. 2. Details are not described herein again.

A location at which the anti-PID module is configured is not limited in this embodiment of this application. For example, the anti-PID module may be independent of an inverter, and is disposed independently, or may be built into the inverter. The following provides descriptions with reference to FIG. 6 and FIG. 9.

Continue to refer to FIG. 6. In this embodiment, the anti-PID module 102 is independent of the inverter 101, and the data collection apparatus 104 separately communicates with the inverter 101, the anti-PID module 102, and the insulation-monitoring module 103.

A communication manner between apparatuses is not limited in this embodiment of this application. For example, the data collection apparatus 104 and the anti-PID module 102 communicate through RS-485, a programmable logic controller (PLC), or a network cable. For another example, the data collection apparatus 104 and the inverter 101 communicate through RS-485, PLC, or a network cable.

A quantity of inverters in the linkage protection system for a photovoltaic power station is not limited in this embodiment of this application. For example, the linkage protection system for a photovoltaic power station includes n inverters, where n is an integer greater than 0. When n=1, reference is made to the embodiment shown in FIG. 6. When n is greater than 1, reference is made to the embodiment shown in FIG. 7.

Figure 7:
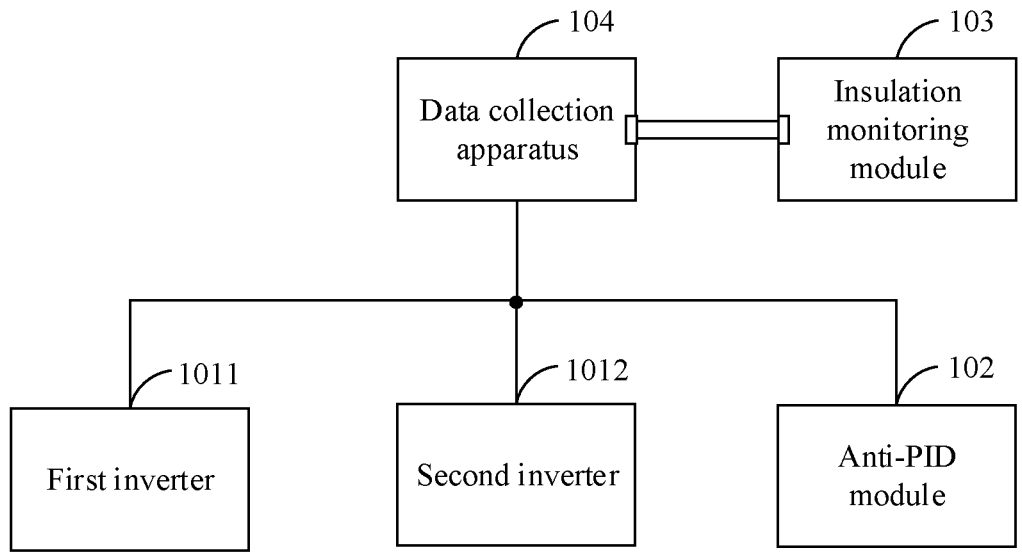
FIG. 7 is a schematic diagram of yet another linkage protection system for a photovoltaic power station according to an embodiment of this application.

FIG. 7 is a schematic diagram of yet another linkage protection system for a photovoltaic power station according to an embodiment of this application.

In this embodiment, there are n inverters, and output ends of the n inverters are connected in parallel, and share a same anti-PID module 102. For ease of description, n=2 is used as an example for description.

As shown in FIG. 7, an output end of the first inverter 1011 and an output end of the second inverter 1012 are connected in parallel, the two inverters share a same anti-PID module 102, and the anti-PID module 102 and an insulation-monitoring module 103 indirectly communicate by using a data collection apparatus 104.

Figure 8:
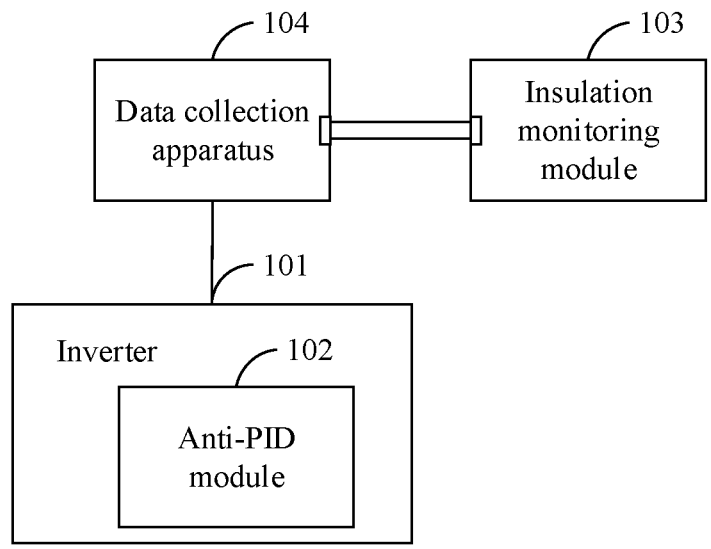
FIG. 8 is a schematic diagram of another linkage protection system for a photovoltaic power station according to an embodiment of this application.

In the embodiments shown in FIG. 6 and FIG. 7, the anti-PID module is independent of the inverter. The following describes, with reference to FIG. 8 and FIG. 9, a case in which the anti-PID module is built into the inverter. In FIG. 8, that there is one inverter is used as an example, and in FIG. 9, that there is more than one inverter is used as an example.

FIG. 8 is a schematic diagram of another linkage protection system for a photovoltaic power station according to an embodiment of this application.

In this embodiment, an anti-PID module 102 is built into an inverter 101, and the anti-PID module 102 and an insulation-monitoring module 103 indirectly communicate by using a data collection apparatus 104.

Figure 9:
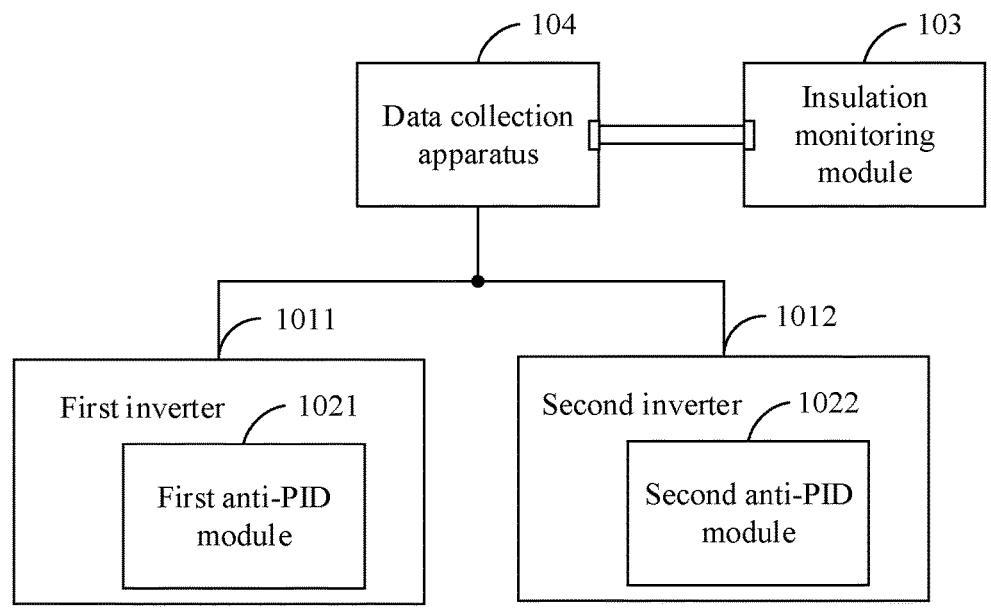
FIG. 9 is a schematic diagram of still another linkage protection system for a photovoltaic power station according to an embodiment of this application.

FIG. 9 is a schematic diagram of still another linkage protection system for a photovoltaic power station according to an embodiment of this application.

In this embodiment, there are n inverters, and one anti-PID module is built into each inverter. The anti-PID module indirectly communicates with an insulation-monitoring module by using a data collection apparatus. For ease of description, n=2 is used as an example for description.

A first anti-PID module 1021 is built into a first inverter 1011, and a second anti-PID module 1022 is built into a second inverter 1012.

A quantity of anti-PID modules that indirectly communicate with an insulation-monitoring module 103 is not limited in this embodiment of this application. For example, the first anti-PID module 1021 and the insulation-monitoring module 103 indirectly communicate by using a data collection apparatus 104. For another example, the second anti-PID module 1022 and the insulation-monitoring module 103 indirectly communicate by using the data collection apparatus 104. For still another example, the first anti-PID module 1021 and the second anti-PID module 1022 jointly communicate with the insulation-monitoring module 103 indirectly by using the data collection apparatus 104.

A case in which an anti-PID module and an insulation-monitoring module indirectly communicate by using a data collection apparatus is described below with reference to FIG. 6.

A communication manner between the data collection apparatus 104 and the inverter 101 is not limited in this embodiment of this application. For example, the data collection apparatus 104 collects data of the inverter 101 based on a communications protocol. When there are a plurality of inverters in the system, the data collection apparatus 104 may further collect data of a plurality of inverters based on the communications protocol.

A communication manner between the data collection apparatus 104 and the anti-PID module 102 is not limited in this embodiment of this application. For example, the data collection apparatus 104 and the anti-PID module 102 communicate by using Modbus Protocol. For another example, the data collection apparatus 104 and the anti-PID module 102 communicate through an RS-485 bus.

A communication manner between the data collection apparatus 104 and an insulation-monitoring module 103 is not limited in this embodiment of this application. For example, the data collection apparatus 104 and the insulation-monitoring module 103 communicate by using Modbus Protocol. For another example, the data collection apparatus 104 and the insulation-monitoring module 103 communicate by using a dry contact. That the data collection apparatus 104 and the insulation-monitoring module 103 communicate by using the dry contact is used as an example for description below. The anti-PID module 102 and the insulation-monitoring module 103 indirectly communicate by using the dry contact by using the data collection apparatus 104. The dry contact includes a first dry contact and a second dry contact, and the first dry contact and the second dry contact are respectively located in the data collection apparatus 104 and the insulation-monitoring module 103. For example, the data collection apparatus 104 includes the first dry contact, and the insulation-monitoring module 103 includes the second dry contact. The first dry contact and the second dry contact are connected, so that the data collection apparatus 104 and the insulation-monitoring module 103 communicate, and the anti-PID module 102 and the insulation-monitoring module 103 indirectly communicate.

Similar to Embodiment 2 of a linkage protection system for a photovoltaic power station, according to different polarities of a dry contact, there are two polarity combinations of the first dry contact and the second dry contact. The two polarity combinations are respectively as follows. In a first polarity combination, the first dry contact is a DO contact, and the second dry contact is a DI contact. In a second polarity combination, the first dry contact is a DI contact, and the second dry contact is a DO contact. The following separately describes the two polarity combinations.

In the first polarity combination, the first dry contact is a DO contact, and the second dry contact is a DI contact.

The data collection apparatus 104 controls the DO contact to be in a first state, so that the insulation-monitoring module 103 monitors a status of the DI contact to stop operating. Similarly, the data collection apparatus 104 further controls the DO contact to be in a second state, so that the insulation-monitoring module 103 monitors a status of the DI contact to start operating.

When the first dry contact included in the data collection apparatus 104 is a DO contact, and the second dry contact included in the insulation-monitoring module 103 is a DI contact, the data collection apparatus 104 is used as a control body of the dry contact. The data collection apparatus 104 controls a status of the DO contact based on an operating state of the anti-PID module 102. Therefore, the insulation-monitoring module 103 adjusts an operating state, so that the anti-PID module 102 and the insulation-monitoring module 103 operate in different time periods.

The data collection apparatus 104 continuously controls the status of the DO contact, so that the anti-PID module 102 and the insulation-monitoring module 103 operate in different time periods.

A manner in which the data collection apparatus 104 controls the DO contact is not limited in this embodiment of this application. For example, a periodic instruction is preset in the data collection apparatus 104. After the anti-PID module 102 prepares to start operating, the data collection apparatus 104 controls the DO contact to be in the first state, so that the insulation-monitoring module 103 monitors the status of the DI contact to stop operating. Then, after the insulation-monitoring module 103 stops operating, the anti-PID module 102 operates for a first time period. Next, the anti-PID module 102 stops operating, the data collection apparatus 104 controls the DO contact to be in the second state, so that the insulation-monitoring module 103 monitors the status of the DI contact to start operating, and operates for the second time period. This cycle is repeated, and the data collection apparatus 104 continuously controls the status of the DO contact, so that the anti-PID module 102 and the insulation-monitoring module 103 operate in different time periods.

Lengths of the first time period and the second time period are not limited in this embodiment of this application. A person skilled in the art may set the lengths based on an actual requirement. For example, the first time period is 60 minutes, and the second period is 15 minutes.

Similar to Embodiment 2 of a linkage protection system for a photovoltaic power station, the DO contact is used as an example, and there are the two cases. The two cases are respectively. Case 1: The first state is a closed state, and the second state is an open state. Case 2: The first state is an open state, and the second state is a closed state. The following separately describes the two cases.

Case 1: The first state is a closed state, and the second state is an open state.

After the data collection apparatus 104 receives a message indicating that the anti-PID module 102 prepares to start operating, the data collection apparatus 104 controls the DO contact to be in the first state, namely, the closed state. If the insulation-monitoring module 103 learns, based on the DI contact, that the DO contact is in a closed state, the insulation-monitoring module 103 stops operating, so that the anti-PID module 102 starts operating. Therefore, the anti-PID module 102 and the insulation-monitoring module 103 operate in different time periods.

After the data collection apparatus 104 receives a message indicating that the anti-PID module 102 stops operating, the data collection apparatus 104 controls the DO contact to be in the second state, namely, the open state. If the insulation-monitoring module 103 learns, based on the DI contact, that the DO contact is in an open state, the insulation-monitoring module 103 starts operating. Therefore, the anti-PID module 102 and the insulation-monitoring module 103 operate in different time periods.

Case 2: The first state is an open state, and the second state is a closed state.

After the data collection apparatus 104 receives a message indicating that the anti-PID module 102 prepares to start operating, the data collection apparatus 104 controls the DO contact to be in the first state, namely, the open state. If the insulation-monitoring module 103 learns, based on the DI contact, that the DO contact is in an open state, the insulation-monitoring module 103 stops operating, so that the anti-PID module 102 starts operating. Therefore, the anti-PID module 102 and the insulation-monitoring module 103 operate in different time periods.

After the data collection apparatus 104 receives a message indicating that the anti-PID module 102 stops operating, the DO contact is controlled to be in the second state, namely, the closed state. If the insulation-monitoring module 103 learns, based on the DI contact, that the DO contact is in a closed state, the insulation-monitoring module 103 starts operating. Therefore, the anti-PID module 102 and the insulation-monitoring module 103 operate in different time periods.

In the second polarity combination, the first dry contact is a DI contact, and the second dry contact is a DO contact.

The insulation-monitoring module 103 controls the DO contact to be in the first state, so that the anti-PID module 102 monitors the status of the DI contact to stop operating. The insulation-monitoring module 103 further controls the DO contact to be in the second state, so that the anti-PID module 102 monitors the status of the DI contact to start operating.

When the first dry contact included in the data collection apparatus 104 is a DI contact, and the second dry contact included in the insulation-monitoring module 103 is a DO contact, the insulation-monitoring module 103 is used as a control body of the dry contact. The insulation-monitoring module 103 controls a status of the DO contact based on an operating state of the insulation-monitoring module 103. Therefore, the anti-PID module 102 adjusts an operating state, so that the anti-PID module 102 and the insulation-monitoring module 103 operate in different time periods.

Similarly, the dry contact has two states. The DO contact is used as an example. There are two cases, and the two cases are respectively as follows. Case 1: The first state is a closed state, and the second state is an open state. Case 2: The first state is an open state, and the second state is a closed state. The two cases of the second polarity combination are basically similar to the two cases of the first polarity combination, and a difference is that control bodies of the dry contact are different. The control body of the first polarity combination is the data collection apparatus 104, and the control body of the second polarity combination is the insulation-monitoring module 103.

This embodiment provides a linkage protection system for a photovoltaic power station. The system is a photovoltaic system, and includes both the anti-PID module and the insulation-monitoring module. The anti-PID module and the insulation-monitoring module indirectly communicate, to obtain information about whether a peer module operates, so that the anti-PID module and the insulation-monitoring module operate in different time periods. In an example, the insulation-monitoring module does not operate when the anti-PID module operates; and the anti-PID module does not operate when the insulation-monitoring module operates. When operating, the anti-PID module is configured to inject a voltage into an input end or an output end of the inverter, to increase or decrease a voltage-to-earth of the photovoltaic system. When operating, the insulation-monitoring module is configured to inject an insulation-monitoring voltage into a DC side or an AC side of the inverter. The anti-PID module and the insulation-monitoring module operate in different time periods, to avoid a problem that the insulation-monitoring module gives an abnormal insulation alarm when a voltage injected when the anti-PID module operates is detected by the insulation-monitoring module. In addition, the system may realize an anti-PID function and detect an insulation fault, to not only avoid PID of a photovoltaic module, but also detect insulation performance of the photovoltaic system, so as to ensure that a photovoltaic power station continuously and reliably runs.

Embodiment 4 of a linkage protection system for a photovoltaic power station.

Embodiment 2 of a linkage protection system for a photovoltaic power station and Embodiment 3 of a linkage protection system for a photovoltaic power station describe a deployment manner of the linkage protection system for a photovoltaic power station in a photovoltaic system. The following describes a deployment manner of a linkage protection system for a photovoltaic power station in a photovoltaic energy storage system. The photovoltaic energy storage system includes a photovoltaic energy storage DC coupling system and a photovoltaic energy storage AC coupling system. The following describes the deployment manner of the linkage protection system for a photovoltaic power station in two cases.

A first case is the photovoltaic energy storage DC coupling system.

Figure 10A:
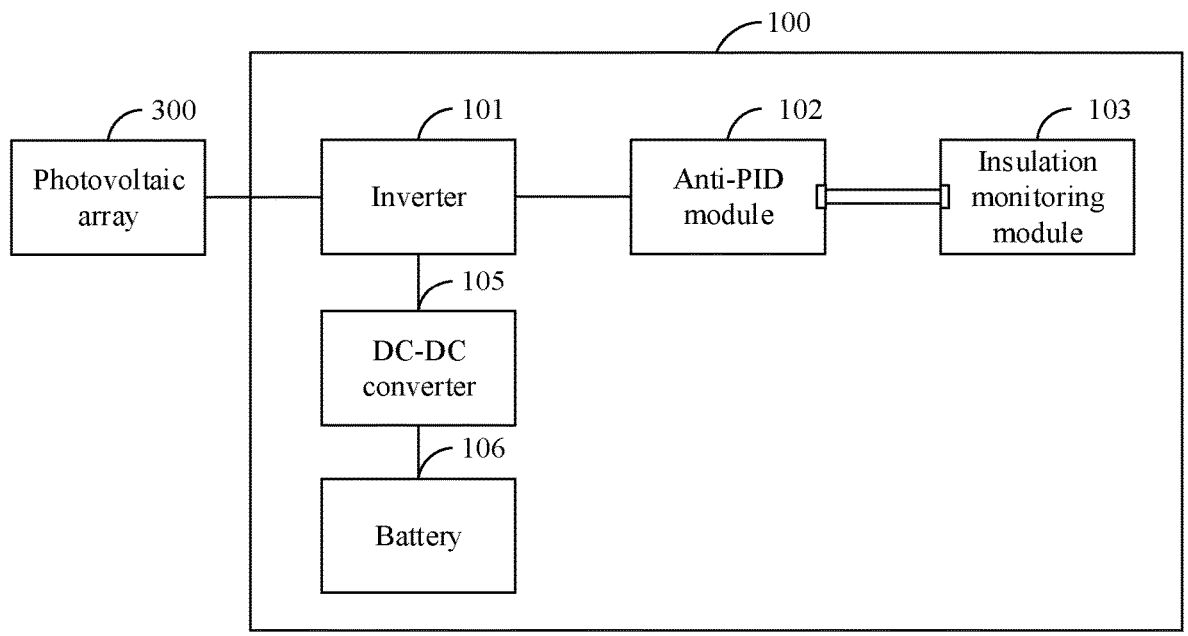
FIG. 10A is a schematic diagram of yet another linkage protection system for a photovoltaic power station according to an embodiment of this application.

FIG. 10A is a schematic diagram of yet another linkage protection system for a photovoltaic power station according to an embodiment of this application.

Figure 10B:
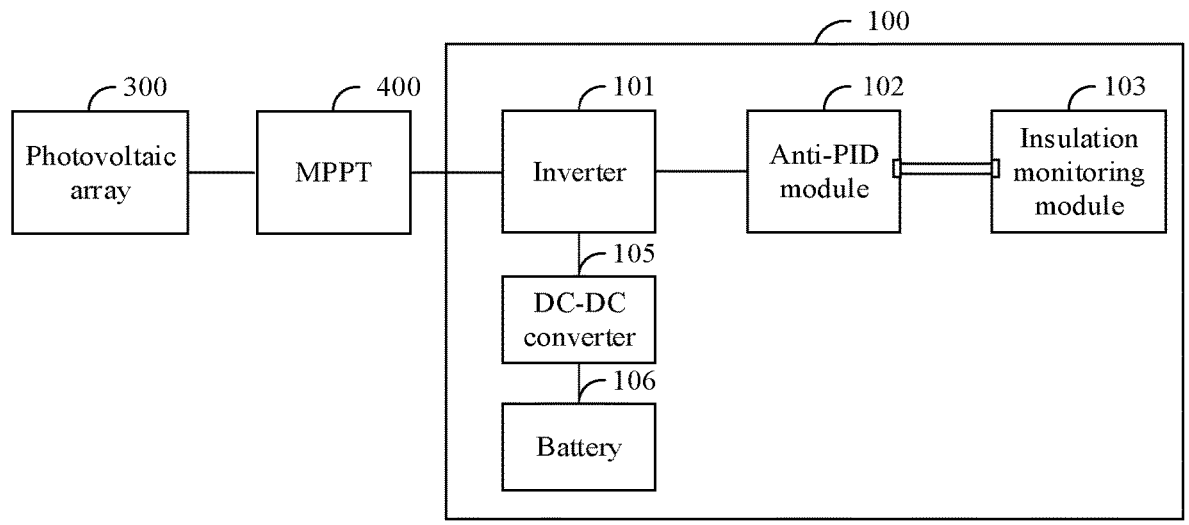
FIG. 10B is a schematic diagram of another linkage protection system for a photovoltaic power station according to an embodiment of this application.

A linkage protection system 100 for a photovoltaic power station is connected to a photovoltaic array 300. As shown in FIG. 10B, the linkage protection system 100 for a photovoltaic power station may be further connected to the photovoltaic array 300 through maximum power point tracking (MPPT) 400.

The linkage protection system 100 for a photovoltaic power station includes an inverter 101, an anti-PID module 102, an insulation-monitoring module 103, a DC-DC converter 105, and a battery 106.

For descriptions of the inverter 101, the anti-PID module 102, and the insulation-monitoring module 103, refer to the embodiment shown in FIG. 2. Details are not described herein again.

A first end of the DC-DC converter 105 is connected to a DC side of the inverter 101, and a second end of the DC-DC converter 101 is connected to the battery 106.

Disposing locations of the anti-PID module 102 and the insulation-monitoring module 103 are not limited in this embodiment of this application. For example, the anti-PID module 102 is disposed on the DC side of the inverter 101, and the insulation-monitoring module 103 is disposed on the DC side of the inverter 101. For another example, the anti-PID module 102 is disposed on an AC side of the inverter 101, and the insulation-monitoring module 103 is disposed on the AC side of the inverter 101. For still another example, the anti-PID module 102 is disposed on the DC side of the inverter 101, and the insulation-monitoring module 103 is disposed on an AC side of the inverter 101. For yet another example, the anti-PID module 102 is disposed on an AC side of the inverter 101, and the insulation-monitoring module 103 is disposed on the DC side of the inverter 101.

There are a total of eight cases based on whether the anti-PID module is integrated inside the inverter, whether the insulation-monitoring module is integrated inside the DC-DC converter, and whether the anti-PID module and the insulation-monitoring module directly communicate. The following respectively describes the linkage protection system 100 for a photovoltaic power station in the photovoltaic energy storage DC coupling system with reference to FIG. 10 to FIG. 17.

Case 1: Referring to FIG. 10A or FIG. 10B, the anti-PID module 102 is independent of the inverter 101, the insulation-monitoring module 103 is independent of the DC-DC converter 105, and the anti-PID module and the insulation-monitoring module directly communicate.

Figure 11:
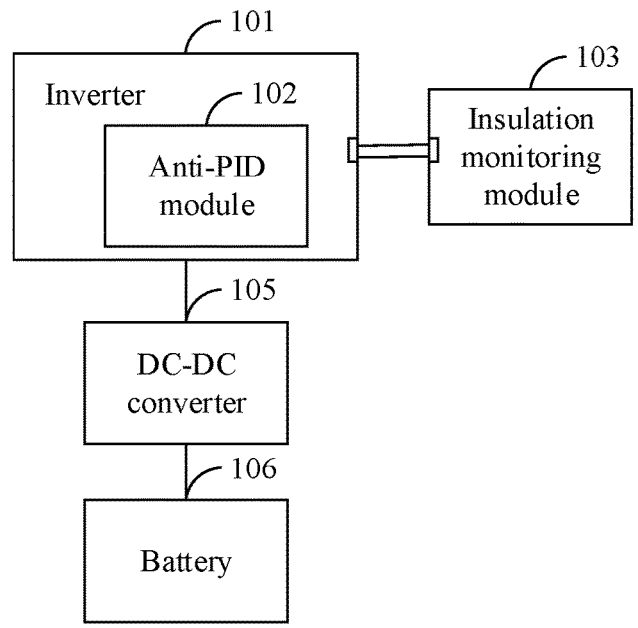
FIG. 11 is a schematic diagram of still another linkage protection system for a photovoltaic power station according to an embodiment of this application.

Case 2: Referring to FIG. 11, the anti-PID module 102 is built into the inverter 101, the insulation-monitoring module 103 is independent of the DC-DC converter 105, and the anti-PID module and the insulation-monitoring module directly communicate.

Figure 12:
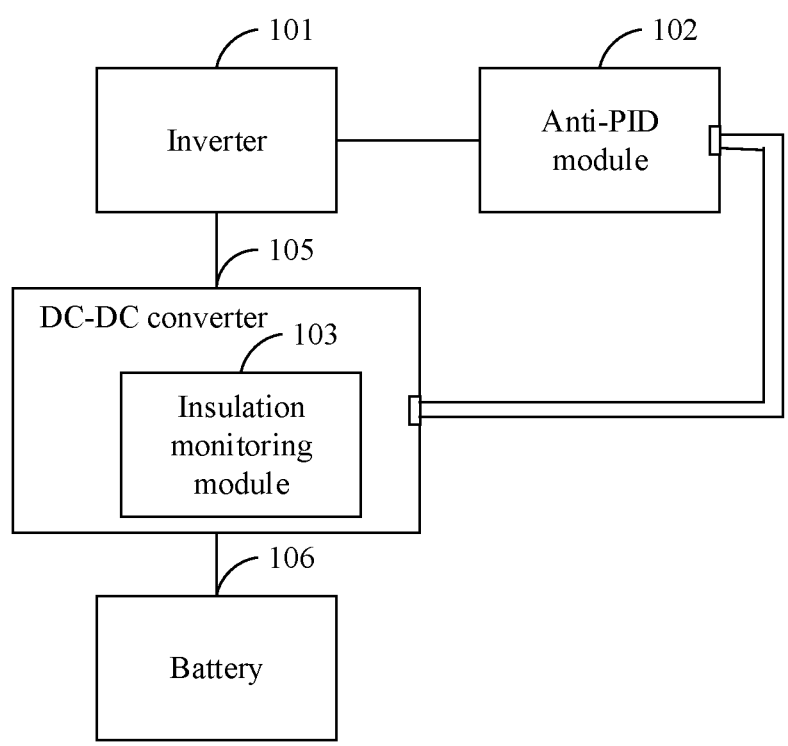
FIG. 12 is a schematic diagram of yet another linkage protection system for a photovoltaic power station according to an embodiment of this application.

Case 3: Referring to FIG. 12, the anti-PID module 102 is independent of the inverter 101, the insulation-monitoring module 103 is built into the DC-DC converter 105, and the anti-PID module and the insulation-monitoring module directly communicate.

Figure 13:
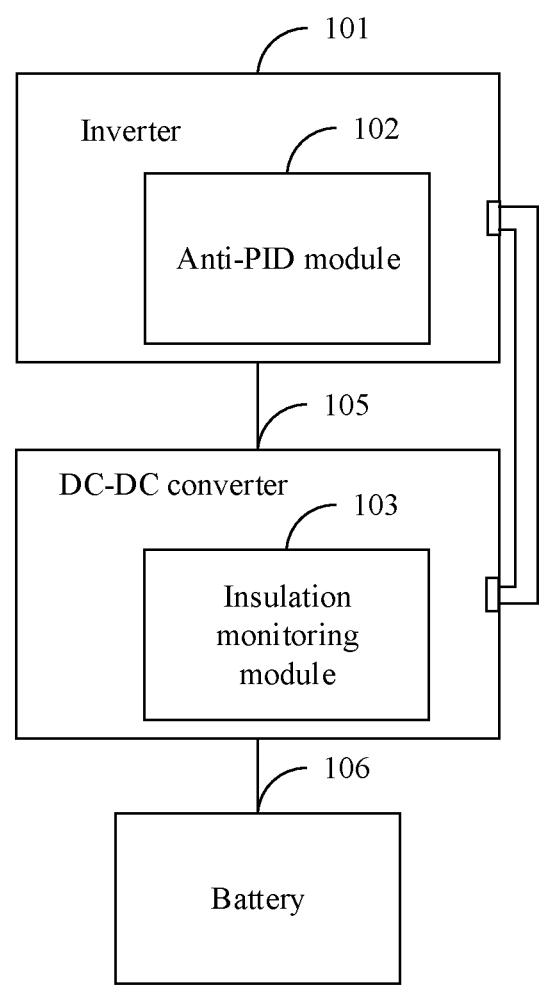
FIG. 13 is a schematic diagram of another linkage protection system for a photovoltaic power station according to an embodiment of this application.

Case 4: Referring to FIG. 13, the anti-PID module 102 is built into the inverter 101, the insulation-monitoring module 103 is built into the DC-DC converter 105, and the anti-PID module and the insulation-monitoring module directly communicate.

Figure 14:
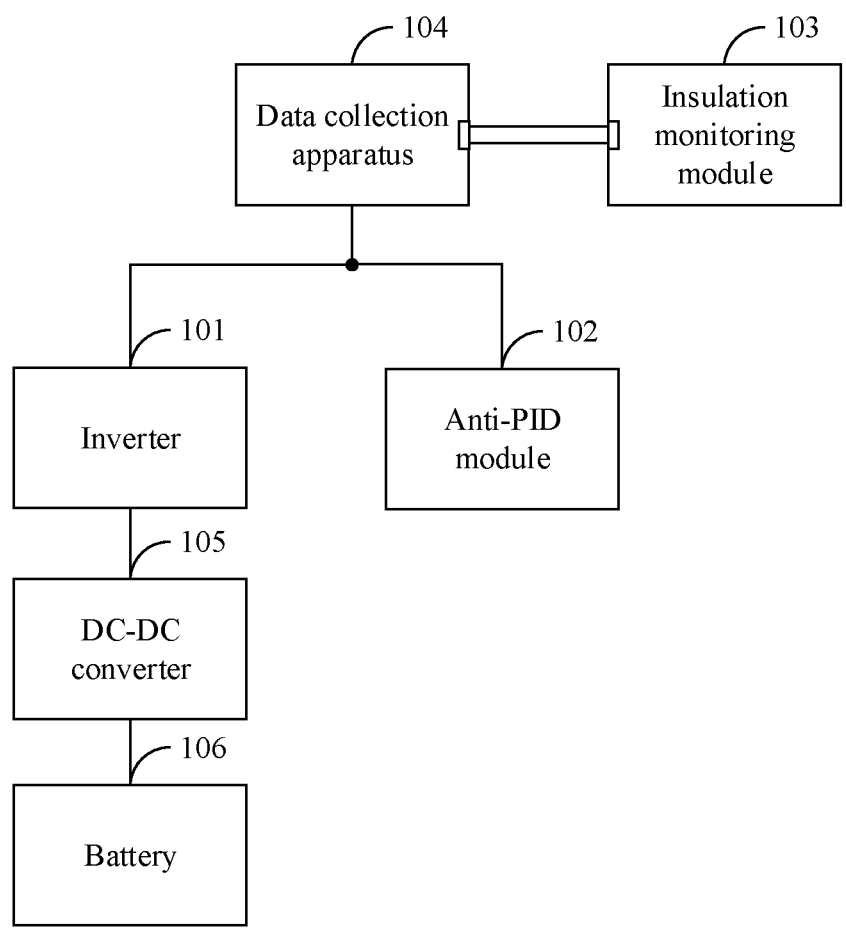
FIG. 14 is a schematic diagram of still another linkage protection system for a photovoltaic power station according to an embodiment of this application.

Case 5: Referring to FIG. 14, the anti-PID module 102 is independent of the inverter 101, the insulation-monitoring module 103 is independent of the DC-DC converter 105, and the anti-PID module and the insulation-monitoring module indirectly communicate.

Figure 15:
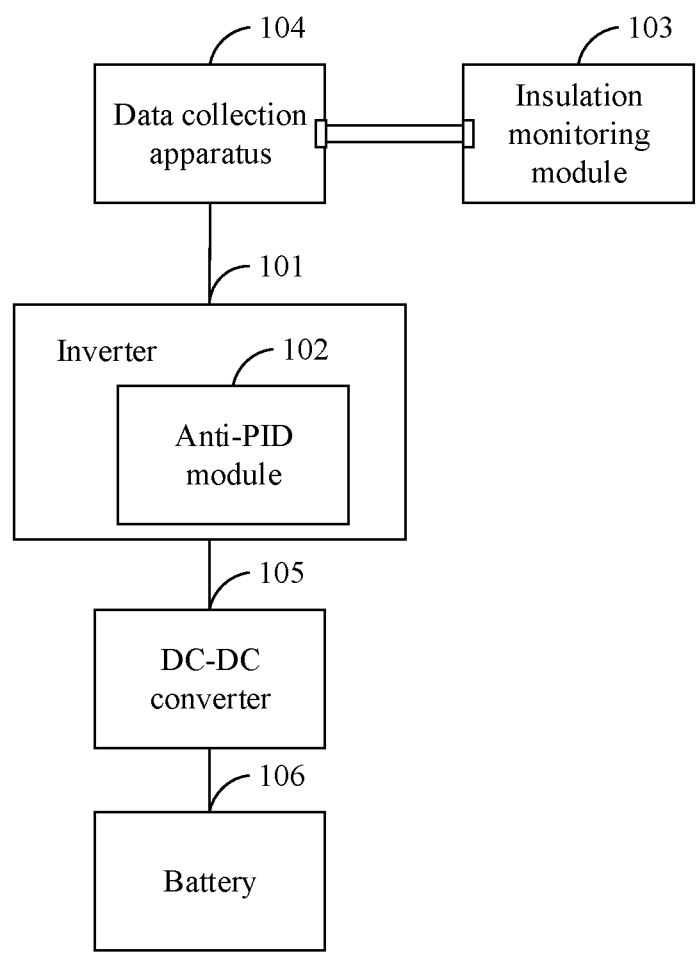
FIG. 15 is a schematic diagram of yet another linkage protection system for a photovoltaic power station according to an embodiment of this application.

Case 6: Referring to FIG. 15, the anti-PID module 102 is built into the inverter 101, the insulation-monitoring module 103 is independent of the DC-DC converter 105, and the anti-PID module and the insulation-monitoring module indirectly communicate.

Figure 16:
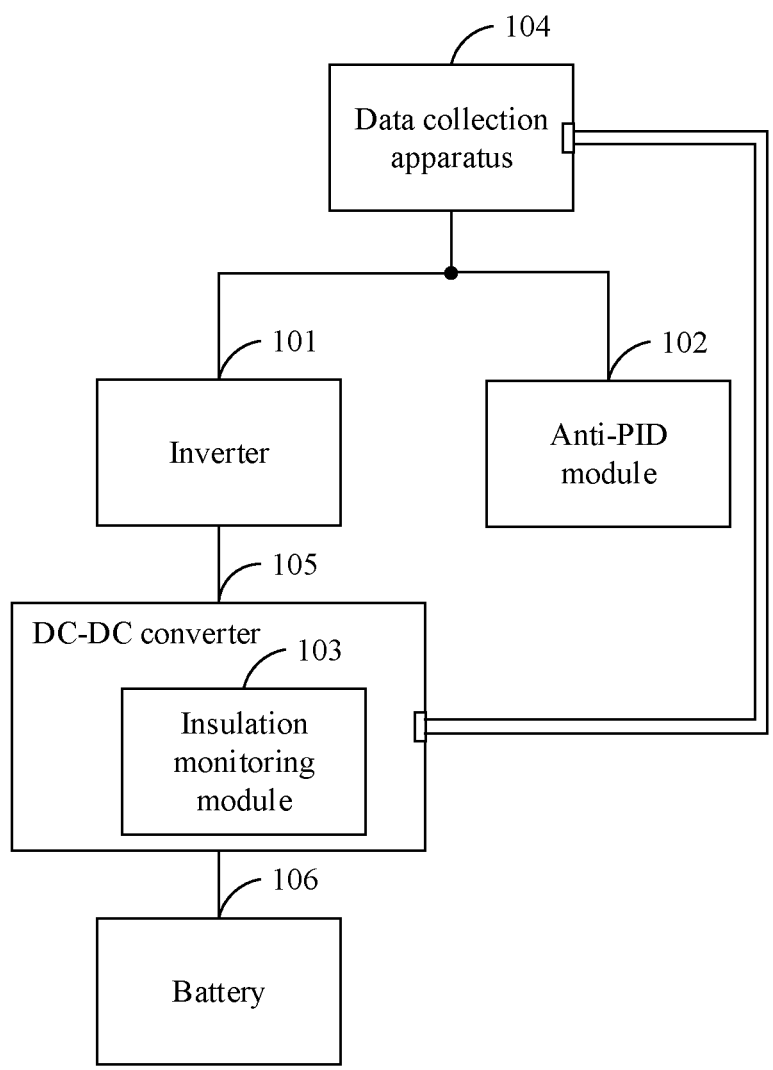
FIG. 16 is a schematic diagram of another linkage protection system for a photovoltaic power station according to an embodiment of this application.

Case 7: Referring to FIG. 16, the anti-PID module 102 is independent of the inverter 101, the insulation-monitoring module 103 is built into the DC-DC converter 105, and the anti-PID module and the insulation-monitoring module indirectly communicate.

Figure 17:
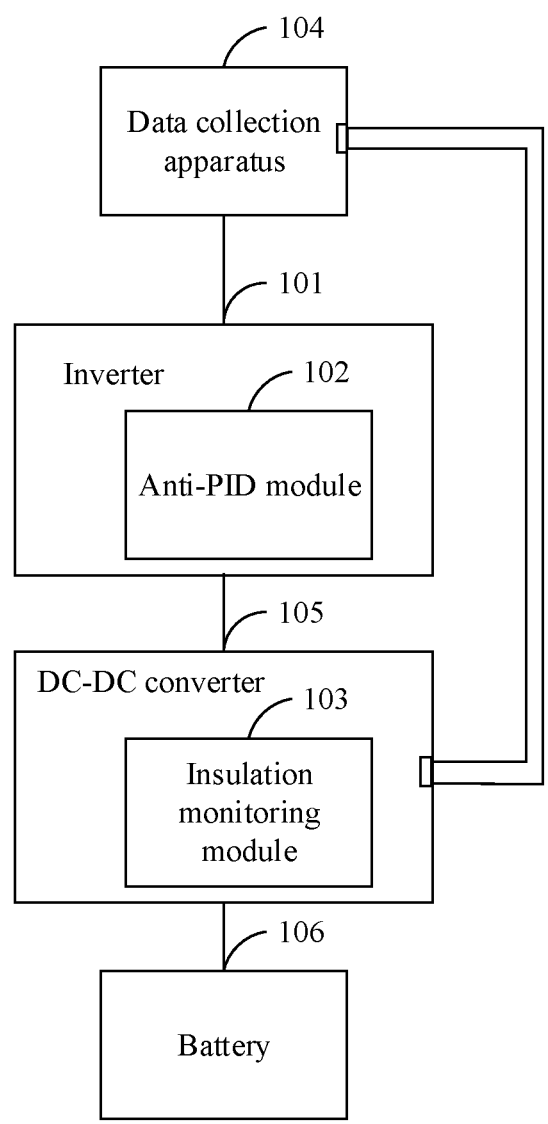
FIG. 17 is a schematic diagram of still another linkage protection system for a photovoltaic power station according to an embodiment of this application.

Case 8: Referring to FIG. 17, the anti-PID module 102 is built into the inverter 101, the insulation-monitoring module 103 is built into the DC-DC converter 105, and the anti-PID module and the insulation-monitoring module indirectly communicate.

For related descriptions of Case 1 to Case 8, refer to the foregoing embodiments. Details are not described herein again.

A second case is the photovoltaic energy storage AC coupling system.

Figure 18A:
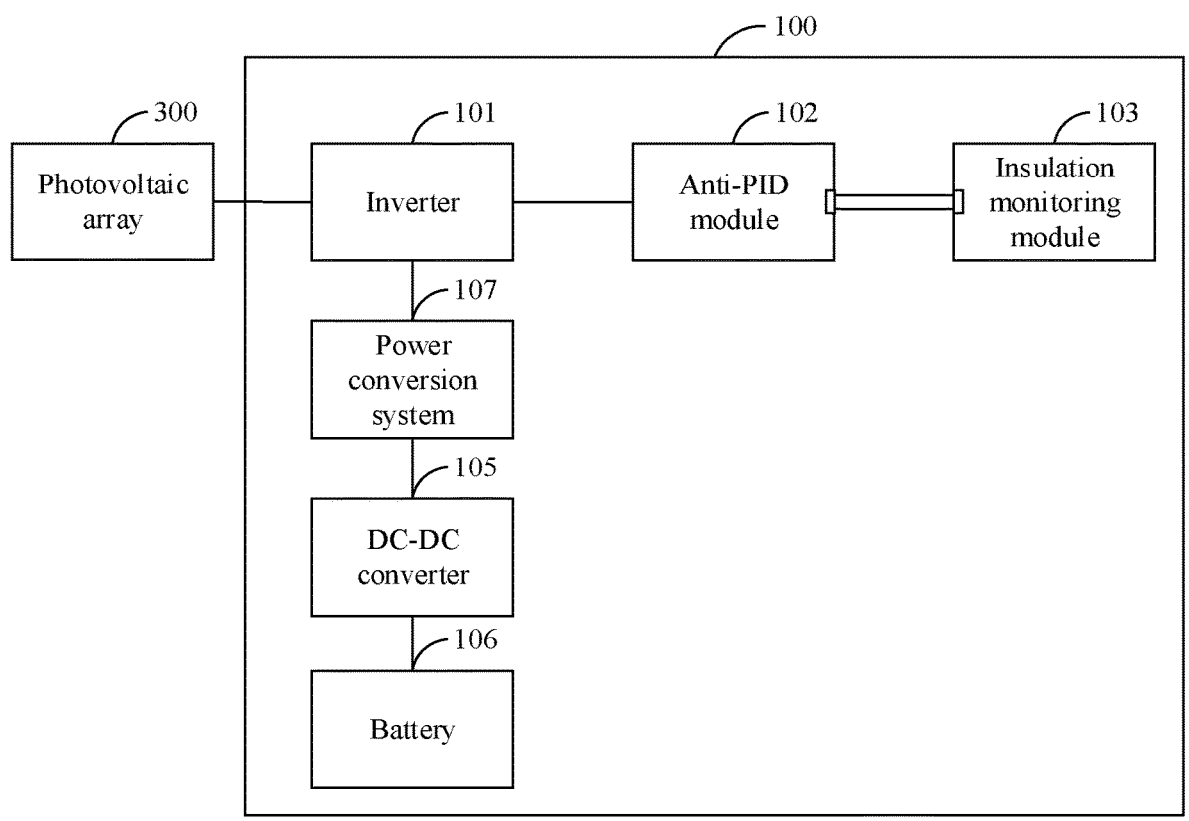
FIG. 18A is a schematic diagram of yet another linkage protection system for a photovoltaic power station according to an embodiment of this application.

FIG. 18A is a schematic diagram of yet another linkage protection system for a photovoltaic power station according to an embodiment of this application.

Figure 18B:
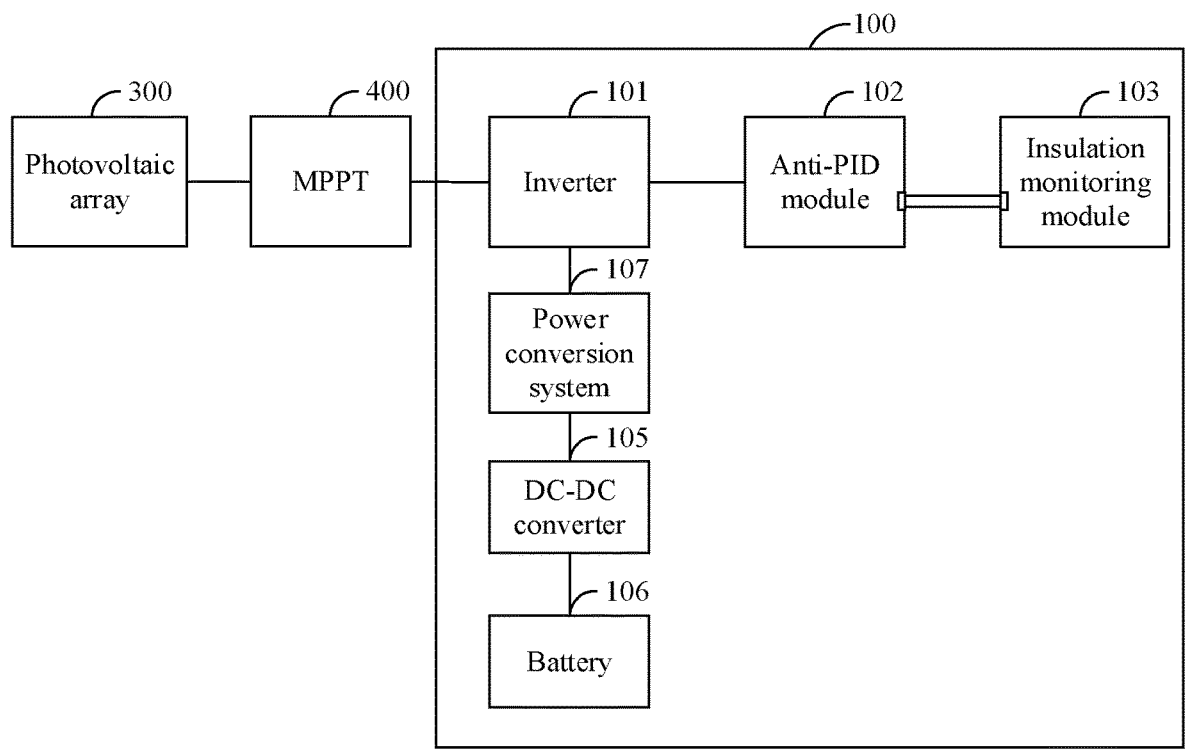
FIG. 18B is a schematic diagram of another linkage protection system for a photovoltaic power station according to an embodiment of this application.

A linkage protection system 100 for a photovoltaic power station is connected to a photovoltaic array 300. As shown in FIG. 18B, the linkage protection system 100 for a photovoltaic power station may be further connected to the photovoltaic array 300 through MPPT 400.

The linkage protection system 100 for a photovoltaic power station includes an inverter 101, an anti-PID module 102, an insulation-monitoring module 103, a DC-DC converter 105, a battery 106, and a power conversion system 107.

For descriptions of the inverter 101, the anti-PID module 102, and the insulation-monitoring module 103, refer to the embodiment shown in FIG. 2. Details are not described herein again.

A first end of the power conversion system 107 is connected to an AC side of the inverter 101, a second end of the power conversion system 107 is connected to a first end of the DC-DC converter 105, and a second end of the DC-DC converter 105 is connected to the battery 106.

Whether the anti-PID module 102 is built into the inverter 101 and whether the anti-PID module 102 and the insulation-monitoring module 103 directly communicate are limited in this embodiment of this application. For related descriptions, refer to the foregoing embodiments. Details are not described herein again.

The embodiment shown in FIG. 18A or FIG. 18B is a case in which the insulation-monitoring module 103 is independent of another device. The following describes, with reference to the accompanying drawings, a case in which the insulation-monitoring module 103 is built into another device.

A quantity of insulation-monitoring modules in the linkage protection system for a photovoltaic power station is not limited in this embodiment of this application. For example, the linkage protection system for a photovoltaic power station includes n insulation-monitoring modules, where n is an integer greater than 0. When n=1, reference is made to the embodiment shown in FIG. 18A or FIG. 18B. When n is greater than 2, reference is made to the embodiment shown in FIG. 19.

Figure 19:
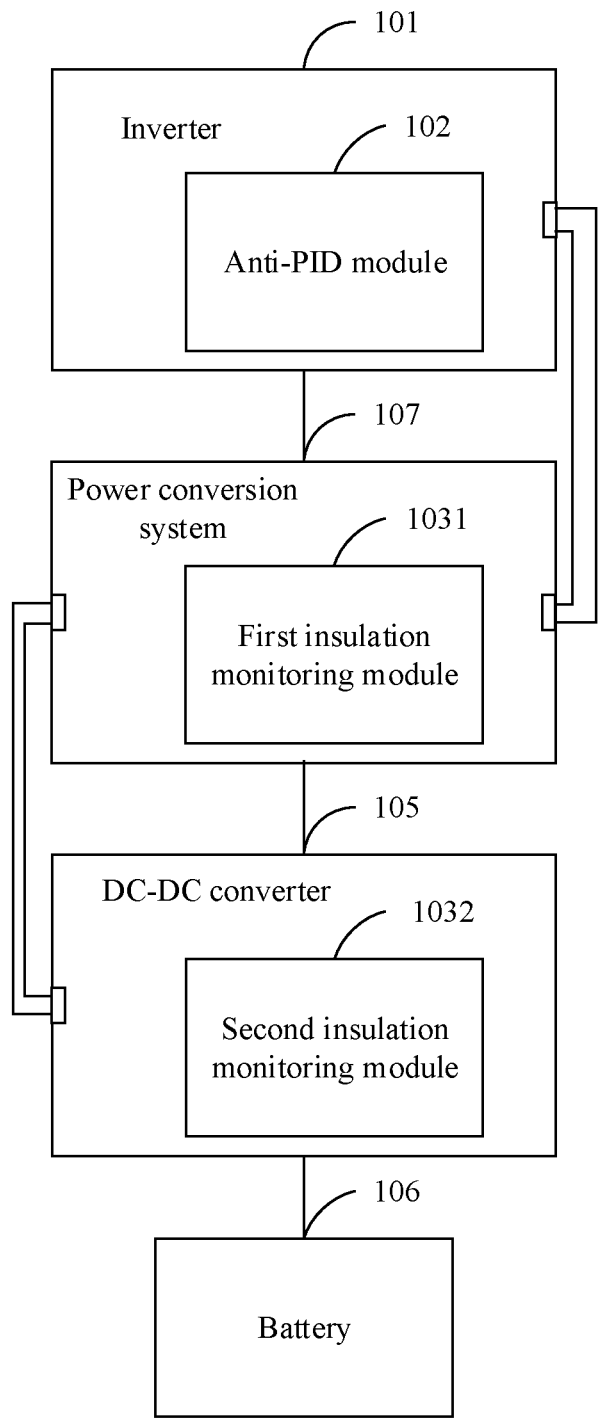
FIG. 19 is a schematic diagram of still another linkage protection system for a photovoltaic power station according to an embodiment of this application.

FIG. 19 is a schematic diagram of still another linkage protection system for a photovoltaic power station according to an embodiment of this application.

The system includes an inverter 101, an anti-PID module 102, an insulation-monitoring module 103, a DC-DC converter 105, a battery 106, and a power conversion system 107.

For ease of description, n=2 is used as an example for description.

The insulation-monitoring module 103 includes a first insulation-monitoring module 1031 and a second insulation-monitoring module 1032.

The first insulation-monitoring module 1031 is disposed inside the DC-DC converter 105, and the second insulation-monitoring module 1032 is disposed inside the power conversion system 107.

A dry contact of the DC-DC converter 105 and a dry contact of the power conversion system 107 communicate by using a dry contact, and when the anti-PID module 102 stops operating, one of the first insulation-monitoring module 1031 and the second insulation-monitoring module 1032 starts operating.

An operating manner of the insulation-monitoring module is not limited in this embodiment of this application. For example, when the DC-DC converter 105 and the power conversion system 107 operate simultaneously, the first insulation-monitoring module 1031 and the second insulation-monitoring module 1032 may alternately operate, or only one of the first insulation-monitoring module 1031 and the second insulation-monitoring module 1032 may operate independently.

In this embodiment of this application, a quantity of anti-PID modules and a quantity of insulation-monitoring module are not limited, and whether the anti-PID module and the insulation-monitoring module are built into another device is not limited. All combinations of related embodiments fall within the protection scope of this application.

This embodiment provides the linkage protection system for a photovoltaic power station, applied to a photovoltaic energy storage system. The system is a photovoltaic system, and includes both the anti-PID module and the insulation-monitoring module. The anti-PID module and the insulation-monitoring module directly or indirectly communicate, to obtain information about whether a peer module operates, so that the anti-PID module and the insulation-monitoring module operate in different time periods. In an example, the insulation-monitoring module does not operate when the anti-PID module operates; and the anti-PID module does not operate when the insulation-monitoring module operates. When operating, the anti-PID module is configured to inject a voltage into an input end or an output end of the inverter, to increase or decrease a voltage-to-earth of the photovoltaic system. When operating, the insulation-monitoring module is configured to inject an insulation-monitoring voltage into a DC side or an AC side of the inverter. The anti-PID module and the insulation-monitoring module operate in different time periods, to avoid a problem that the insulation-monitoring module gives an abnormal insulation alarm when a voltage injected when the anti-PID module operates is detected by the insulation-monitoring module. In addition, the system may realize an anti-PID function and detect an insulation fault, to not only avoid PID of a photovoltaic module, but also detect insulation performance of the photovoltaic system, so as to ensure that a photovoltaic power station continuously and reliably runs.

Embodiment of a linkage protection method for a photovoltaic power station.

Based on the linkage protection system for a photovoltaic power station provided in the foregoing embodiments, this application further provides a linkage protection method for a photovoltaic power station, applied to a photovoltaic system.

The linkage protection system for a photovoltaic power station includes an inverter, an anti-PID module, and an insulation-monitoring module.

The method includes controlling the anti-PID module and the insulation-monitoring module to communicate with each other and perform linkage control, so that the anti-PID module and the insulation-monitoring module alternately operate in different time periods. For example, in a time period, when the anti-PID module operates, the insulation-monitoring module does not operate, and in a next time period, when the insulation-monitoring module operates, the anti-PID module does not operate.

A communication manner between an anti-PID module 102 and an insulation-monitoring module 103 is not limited in this embodiment of this application. For example, the anti-PID module 102 and the insulation-monitoring module 103 communicate by using Modbus Protocol. For another example, the anti-PID module 102 and the insulation-monitoring module 103 communicate by using a dry contact.

Whether the anti-PID module 102 and the insulation-monitoring module 103 directly communicate or indirectly communicate is not limited in this embodiment of this application. For example, the anti-PID module 102 and the insulation-monitoring module 103 directly communicate by using Modbus Protocol, or the anti-PID module 102 and the insulation-monitoring module 103 indirectly communicate by using Modbus Protocol. For another example, the anti-PID module 102 and the insulation-monitoring module 103 directly communicate by using the dry contact, or the anti-PID module 102 and the insulation-monitoring module 103 indirectly communicate by using the dry contact.

Figure 20:
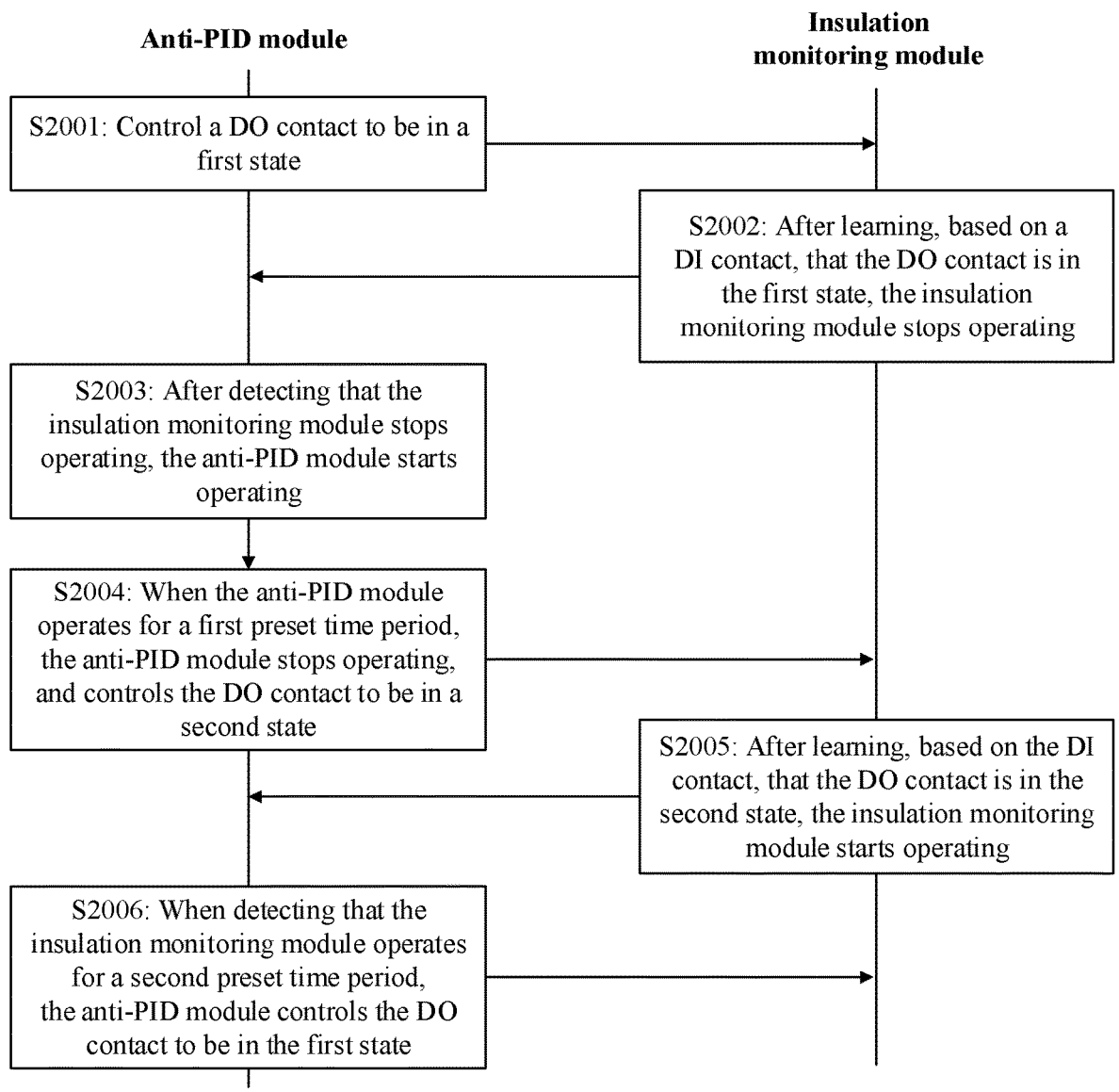
FIG. 20 is a flowchart of a linkage method for a photovoltaic power station according to an embodiment of this application.
Figure 21:
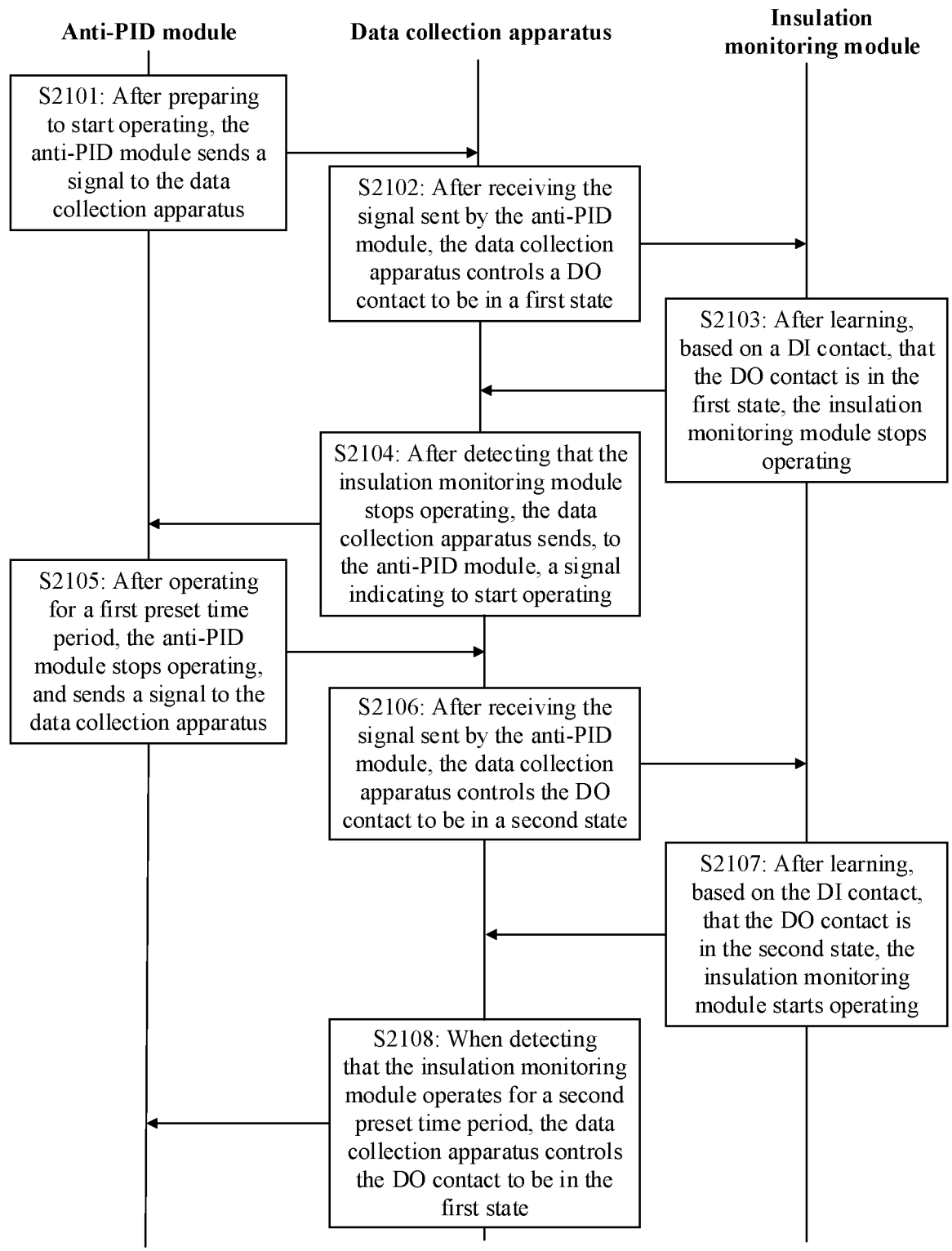
FIG. 21 is a flowchart of another linkage method for a photovoltaic power station according to an embodiment of this application.

The following describes, with reference to FIG. 20, a case in which the anti-PID module and the insulation-monitoring module directly communicate by using the dry contact, and describes, with reference to FIG. 21, a case in which the anti-PID module and the insulation-monitoring module indirectly communicate by using the dry contact.

In this embodiment of this application, whether the anti-PID module or the insulation-monitoring module starts operating first is not limited. For ease of description, the following provides descriptions by using an example in which the anti-PID module starts operating first.

FIG. 20 is a flowchart of a linkage method for a photovoltaic power station according to an embodiment of this application.

S2001: An anti-PID module controls a DO contact to be in a first state.

A time point at which the anti-PID module starts operating is not limited in this embodiment of this application. For example, after detecting that an inverter is started, the anti-PID module prepares to start operating. For another example, after an insulation-monitoring module stops operating, the anti-PID module prepares to start operating.

A body for detecting that the inverter is started is not limited in this embodiment of this application. For example, the anti-PID module may detect that the inverter is started. For another example, a data collection apparatus may alternatively detect that the inverter is started. For example, the data collection apparatus collects inverter information in real time, and the data collection apparatus synchronizes the inverter information to the anti-PID module in real time, so that the anti-PID module learns of the inverter information.

A first state is not limited in this embodiment of this application. For example, the first state may be that a DO contact is closed. For another example, the first state is that the DO contact is open.

S2002: After the insulation-monitoring module learns, based on a DI contact, that the DO contact is in the first state, the insulation-monitoring module stops operating.

The DO contact and the DI contact are connected. After the anti-PID module controls the DO contact to be in the first state, the DI contact may learn of a status of the DO contact. Therefore, the insulation-monitoring module stops operating.

For example, after the DO contact changes to the first state, the DO contact may output a signal, for example, a high-level signal or a digital signal 1. Then, after the DI contact identifies the signal output by the DO contact, the insulation-monitoring module learns, based on the signal obtained by the DI contact, that the anti-PID module is to start operating. In this case, the insulation-monitoring module stops operating, so that the insulation-monitoring module and the anti-PID module operate in different time periods.

S2003: After the anti-PID module detects that the insulation-monitoring module stops operating, the anti-PID module starts operating.

A manner in which the anti-PID module detects that the insulation-monitoring module stops operating is not limited in this application. For example, after the insulation-monitoring module stops operating, the insulation-monitoring module feeds back, to the anti-PID module, a signal indicating that the insulation-monitoring module stops operating. For another example, the anti-PID module sets a preset delay time period. After the anti-PID module controls the DO contact to be in the first state, when the preset delay time period is satisfied, the anti-PID module considers by default that the insulation-monitoring module has stopped operating, and the anti-PID module starts operating.

A value of the preset delay time period is not limited in this application. A person skilled in the art may set the value based on an actual requirement.

S2004: When the anti-PID module operates for a first preset time period, the anti-PID module stops operating, and controls the DO contact to be in a second state.

The second state is not limited in this application. For example, the second state is that the DO contact is open. For another example, the second state is that the DO contact is closed.

The second state and the first state are different states. For example, when the first state is that the DO contact is closed, the second state is that the DO contact is open. When the first state is that the DO contact is open, the second state is that the DO contact is closed.

A value of the first preset time period is not limited in this application. A person skilled in the art may set the value based on an actual requirement. For example, the first preset time period is 60 minutes.

S2005: After the insulation-monitoring module learns, based on the DI contact, that the DO contact is in the second state, the insulation-monitoring module starts operating.

The DO contact and the DI contact are connected. After the anti-PID module controls the DO contact to be in the second state, the DI contact may learn of a status of the DO contact. Therefore, the insulation-monitoring module starts operating.

For example, after the DO contact changes to the second state, the DO contact may output a signal, for example, a low-level signal or a digital signal 0. Then, after the DI contact identifies the signal output by the DO contact, the insulation-monitoring module learns, based on the signal obtained by the DI contact, that the anti-PID module has stopped operating. In this case, the insulation-monitoring module starts operating, so that the insulation-monitoring module and the anti-PID module operate in different time periods.

S2006: When the anti-PID module detects that the insulation-monitoring module operates for a second preset time period, the anti-PID module controls the DO contact to be in the first state.

A value of the second preset time period is not limited in this application. A person skilled in the art may set the value based on an actual requirement. For example, the second preset time period is 15 minutes.

The foregoing describes a case in which the anti-PID module and the insulation-monitoring module directly communicate, and the following describes, with reference to FIG. 21, a case in which the anti-PID module and the insulation-monitoring module indirectly communicate.

In this application, whether the anti-PID module or the insulation-monitoring module starts operating first is not limited. For ease of description, the following provides descriptions by using an example in which the anti-PID module starts operating first.

An intermediate apparatus between the anti-PID module and the insulation-monitoring module is not limited in this embodiment of this application. A person skilled in the art may set the intermediate apparatus based on an actual requirement.

For ease of description, that the intermediate apparatus is a data collection apparatus is used for description below.

FIG. 21 is a flowchart of another linkage method for a photovoltaic power station according to an embodiment of this application.

S2101: After preparing to start operating, an anti-PID module sends a signal to a data collection apparatus.

The anti-PID module sends an operating state (in an example, the anti-PID module is to start operating) of the anti-PID module to the data collection apparatus.

In addition, in an actual implementation, the data collection apparatus may alternatively control operating, and when the data collection apparatus finds that the inverter has been grid-connected in daytime, the anti-PID module starts operating.

A communication manner between the data collection apparatus and the anti-PID module is not limited in this embodiment of this application. For example, the data collection apparatus and the anti-PID module communicate through RS-485, PLC, or a network cable.

An amount of information that is about the anti-PID module and that is collected by the data collection apparatus is not limited in this embodiment of this application. For example, when the anti-PID module is built into the inverter, the data collection apparatus collects an operating state of the anti-PID built into the inverter, and then the data collection apparatus controls an operating state of anti-PID in another inverter.

S2102: After receiving the signal sent by the anti-PID module, the data collection apparatus controls a DO contact to be in a first state.

The first state is not limited in this embodiment of this application. For example, the first state may be that the DO contact is closed. For another example, the first state is that the DO contact is open.

The data collection apparatus may continuously notify the anti-PID module in a third preset time period that the insulation-monitoring apparatus has stopped operating.

To prevent a communication link from being broken, continuous instructions may be provided during actual operating, to help a device determine whether communication is normal. If the communication link is broken, in consideration of safety of a photovoltaic system, the insulation-monitoring module mainly operates, and the anti-PID module stops operating.

A value of the third preset time period is not limited in this application. A person skilled in the art may set the value based on an actual requirement. For example, the third preset time period is five seconds.

S2103: After the insulation-monitoring module learns, based on a DI contact, that the DO contact is in the first state, the insulation-monitoring module stops operating.

The DO contact and the DI contact are connected. After the anti-PID module controls the DO contact to be in the first state, the DI contact may learn of a status of the DO contact. Therefore, the insulation-monitoring module stops operating, so that the insulation-monitoring module and the anti-PID module operate in different time periods.

For example, after the DO contact changes to the first state, the DO contact may output a signal, for example, a high-level signal or a digital signal 1. Then, after the DI contact identifies the signal output by the DO contact, the insulation-monitoring module learns, based on the signal obtained by the DI contact, that the anti-PID module is to start operating. In this case, the insulation-monitoring module stops operating, so that the insulation-monitoring module and the anti-PID module operate in different time periods.

S2104: After detecting that the insulation-monitoring module stops operating, the data collection apparatus sends, to the anti-PID module, a signal indicating to start operating.

A manner in which the data collection apparatus detects that the insulation-monitoring module stops operating is not limited in this application. For example, after the insulation-monitoring module stops operating, the insulation-monitoring module feeds back, to the data collection apparatus, a signal indicating that the insulation-monitoring module stops operating. For another example, the data collection apparatus sets a preset delay time period. After the data collection apparatus controls the DO contact to be in the first state, and the preset delay time period is satisfied, the data collection apparatus considers by default that the insulation-monitoring module has stopped operating, and sends, to the anti-PID module, the signal indicating to start operating.

A value of the preset delay time period is not limited in this application. A person skilled in the art may set the value based on an actual requirement.

If the anti-PID module does not receive, in a fourth preset time period, the signal that indicates to start operating and that is sent by the data collection apparatus, the anti-PID module reports an alarm "Device is abnormal".

A value of the fourth preset time period is not limited in this application. A person skilled in the art may set the value based on an actual requirement. For example, the fourth preset time period is 10 minutes.

S2105: After operating for a first preset time period, the anti-PID module stops operating, and sends a signal to the data collection apparatus.

The anti-PID module sends an operating state (in an example, the anti-PID module stops operating) of the anti-PID module to the data collection apparatus.

A value of the first preset time period is not limited in this application. A person skilled in the art may set the value based on an actual requirement. For example, the first preset time period is 60 minutes.

S2106: After receiving the signal sent by the anti-PID module, the data collection apparatus controls a DO contact to be in a second state.

The second state is not limited in this application. For example, the second state is that the DO contact is open. For another example, the second state is that the DO contact is closed.

The second state and the first state are different states. For example, when the first state is that the DO contact is closed, the second state is that the DO contact is open. When the first state is that the DO contact is open, the second state is that the DO contact is closed.

S2107: After the insulation-monitoring module learns, based on the DI contact, that the DO contact is in the second state, the insulation-monitoring module starts operating.

The DO contact and the DI contact are connected. After the anti-PID module controls the DO contact to be in the second state, the DI contact may learn of a status of the DO contact. Therefore, the insulation-monitoring module starts operating.

For example, after the DO contact changes to the second state, the DO contact may output a signal, for example, a low-level signal or a digital signal 0. Then, after the DI contact identifies the signal output by the DO contact, the insulation-monitoring module learns, based on the signal obtained by the DI contact, that the anti-PID module has stopped operating. In this case, the insulation-monitoring module starts operating, so that the insulation-monitoring module and the anti-PID module operate in different time periods.

S2108: When the data collection apparatus detects that the insulation-monitoring module operates for a second preset time period, the data collection apparatus controls the DO contact to be in the first state.

A value of the second preset time period is not limited in this application. A person skilled in the art may set the value based on an actual requirement. For example, the second preset time period is 15 minutes.

This embodiment provides the linkage protection method for a photovoltaic power station. The method is applied to a photovoltaic system. The photovoltaic system includes both the anti-PID module and the insulation-monitoring module. The anti-PID module and the insulation-monitoring module directly or indirectly communicate, to obtain information about whether a peer module operates, so that the anti-PID module and the insulation-monitoring module operate in different time periods. In an example, the insulation-monitoring module does not operate when the anti-PID module operates; and the anti-PID module does not operate when the insulation-monitoring module operates. When operating, the anti-PID module is configured to inject a voltage into an input end or an output end of the inverter, to increase or decrease a voltage-to-earth of the photovoltaic system. When operating, the insulation-monitoring module is configured to inject an insulation-monitoring voltage into a DC side or an AC side of the inverter. The anti-PID module and the insulation-monitoring module operate in different time periods, to avoid a problem that the insulation-monitoring module gives an abnormal insulation alarm when a voltage injected when the anti-PID module operates is detected by the insulation-monitoring module. In addition, the system may realize an anti-PID function and detect an insulation fault, to not only avoid PID of a photovoltaic module, but also detect insulation performance of the photovoltaic system, so as to ensure that a photovoltaic power station continuously and reliably runs.

It should be understood that, in this application, "at least one" means one or more, and "a plurality of" means two or more. The term "and/or" is used to describe an association relationship between associated objects, and represents that three relationships may exist. For example, "A and/or B" may represent the following three cases such as only A exists, only B exists, and both A and B exist, where A and B may be singular or plural. The character "I" usually indicates an "or" relationship between the associated objects. "At least one of the following items (pieces)" or a similar expression thereof indicates any combination of these items, including a single item (for example, piece) or any combination of a plurality of items (pieces). For example, at least one (piece) of a, b, or c may represent: a, b, c, "a and b", "a and c", "b and c", or "a, b, and c", where a, b, and c may be singular or plural.

The foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A linkage protection system and comprising:
an inverter comprising an inverter input end and an inverter output end;
an anti-potential-induced degradation (PID) apparatus coupled to the inverter, wherein the anti-PID apparatus is configured to:
inject a first voltage into the inverter input end to increase a voltage-to-earth potential of a photovoltaic system; and
inject a second voltage into the inverter output end to decrease the voltage-to-earth potential of the photovoltaic system; and
an insulation-monitoring apparatus coupled to the inverter and to the anti-PID apparatus and comprising a first dry contact, wherein the insulation-monitoring apparatus is configured to directly communicate with the anti-PID apparatus via the first dry contact, and wherein the insulation-monitoring apparatus is further configured to:
inject an insulation-monitoring voltage into an inverter direct current (DC) side or into an inverter alternating current (AC) side, wherein the inverter input end is coupled to the inverter DC side, and wherein the inverter output end is coupled to the inverter AC side;
communicate with the anti-PID apparatus to perform linkage control; and
alternately operate the anti-PID apparatus and the insulation-monitoring apparatus in different time periods based on communication with the anti-PID apparatus.

2. The linkage protection system of claim 1, wherein the anti-PID apparatus is configured to operate while the insulation-monitoring apparatus does not operate in a first time period and when the anti-PID apparatus and the insulation-monitoring apparatus alternately operate in different time periods, and wherein the insulation-monitoring apparatus is configured to operate while the anti-PID apparatus does not operate in a second time period and when the anti-PID apparatus and the insulation-monitoring apparatus alternately operate in different time periods.

3. The linkage protection system of claim 1, wherein the anti-PID apparatus and the insulation-monitoring apparatus are configured to directly or indirectly communicate via a Modbus Protocol.

4. The linkage protection system of claim 1, wherein the anti-PID apparatus and the insulation-monitoring apparatus are configured to directly or indirectly communicate with each other via the first dry contact.

5. The linkage protection system of claim 4, wherein the anti-PID apparatus comprises a second dry contact, and wherein the first dry contact is configured to connect with the second dry contact when the anti-PID apparatus and the insulation-monitoring apparatus directly communicate with each other.

6. The linkage protection system of claim 5, wherein the second dry contact is a digital output (DO) contact, wherein the first dry contact is a digital input (DI) contact, and wherein the anti-PID apparatus is further configured to:
control the DO contact to be in a first state to enable the insulation-monitoring apparatus to monitor a status of the DI contact to stop operating; and
control the DO contact to be in a second state to enable the insulation-monitoring apparatus to monitor the status of the DI contact to start operating.

7. The linkage protection system of claim 5, wherein the second dry contact is a digital input (DI) contact, wherein the first dry contact is a digital output (DO) contact, and wherein the insulation-monitoring apparatus is further configured to:
control the DO contact to be in a first state to enable the anti-PID apparatus to monitor a status of the DI contact to stop operating; and
control the DO contact to be in a second state to enable the anti-PID apparatus to monitor the status of the DI contact to start operating.

8. The linkage protection system of claim 4, further comprising a data collection apparatus configured to communicate with the anti-PID apparatus, wherein the data collection apparatus comprises a second dry contact, and wherein the second dry contact and the first dry contact are configured to connect when the anti-PID apparatus and the insulation-monitoring apparatus indirectly communicate with each other.

9. The linkage protection system of claim 8, wherein the second dry contact is a digital output (DO) contact, wherein the first dry contact is a digital input (DI) contact, and wherein the data collection apparatus is further configured to:
control the DO contact to be in a first state to enable the insulation-monitoring apparatus to monitor a status of the DI contact to stop operating; and
control the DO contact to be in a second state to enable the insulation-monitoring apparatus to monitor the status of the DI contact to start operating.

10. The linkage protection system of claim 8, wherein the second dry contact is a digital input (DI) contact, wherein the first dry contact is a digital output (DO) contact, and wherein the insulation-monitoring apparatus is further configured to:
control the DO contact to be in a first state to enable the data collection apparatus to monitor a status of the DI contact to notify the anti-PID apparatus to stop operating; and
control the DO contact to be in a second state to enable the data collection apparatus to monitor the status of the DI contact to notify the anti-PID apparatus to start operating.

11. The linkage protection system of claim 1, wherein the anti-PID apparatus is external to the inverter, wherein the linkage protection system comprises a plurality of inverters, wherein inverter output ends of the plurality of inverters are connected in parallel, and wherein the plurality of inverters share a same anti-PID apparatus.

12. The linkage protection system of claim 1, wherein the anti-PID apparatus is internal to the inverter.

13. The linkage protection system of claim 12, wherein the linkage protection system comprises a plurality of inverters, wherein inverter output ends of the plurality of inverters are connected in parallel, wherein each of the plurality of inverters comprises one anti-PID apparatus, wherein each anti-PID apparatus in the plurality of inverters communicates with the insulation-monitoring apparatus, and wherein anti-PID apparatuses of all the plurality of inverters synchronously start operating or synchronously stop operating.

14. The linkage protection system of claim 1, further comprising:
a DC-DC converter comprising a DC-DC converter first end and a DC-DC converter second end, wherein the DC-DC converter first end is connected to the inverter DC side; and a battery connected to the DC-DC converter second end, wherein the insulation-monitoring apparatus is integrated inside the DC-DC converter.

15. The linkage protection system of claim 1, further comprising:
   a battery;
   a DC-DC converter comprising a DC-DC converter first end, a DC-DC converter second end connected to the battery, and a DC-DC converter dry contact; and
   a power conversion system comprising:
      a first power conversion system end is connected to the AC side;
      a second power conversion system end connected to the DC-DC converter first end; and
      a power conversion system dry contact, wherein the second power conversion system end is connected to the DC-DC converter first end, and wherein the DC-DC converter second end is connected to the battery,
   wherein the insulation-monitoring apparatus comprises:
      a first insulation-monitoring apparatus disposed inside the DC-DC converter; and
      a second insulation-monitoring apparatus disposed inside the power conversion system,
   wherein the DC-DC converter dry contact is configured to communicate with the power conversion system dry contact via the DC-DC converter dry contact or the power conversion system dry contact, and wherein the first insulation-monitoring apparatus or the second insulation-monitoring apparatus is configured to start operating when the anti-PID apparatus stops operating.

16. The linkage protection system of claim 1, wherein the anti-PID apparatus is further configured to:
   perform insulation-monitoring when operating;
   stop operating when insulation impedance is less than a first preset value; and
   instruct the insulation-monitoring apparatus to start operating for performing insulation-monitoring.

17. A linkage protection method for a photovoltaic system, wherein the linkage protection method comprises:
   controlling an anti-potential-induced degradation (PID) apparatus and an insulation-monitoring apparatus to directly communicate with each other via a first dry contact of the insulation-monitoring apparatus and to perform linkage control;
   controlling to cause the anti-PID apparatus and the insulation-monitoring apparatus to alternately operate in different time periods;
   controlling the anti-PID apparatus to inject a voltage into an inverter input end of an inverter or into an inverter output end of the inverter to respectively increase or decrease a voltage-to-earth potential of the photovoltaic system; and
   controlling the insulation-monitoring apparatus to inject an insulation-monitoring voltage into an inverter direct current (DC) side or an inverter alternating current (AC) side of the inverter.

18. The linkage protection method of claim 17, further comprising:
   operating the anti-PID apparatus while disabling operation of the insulation-monitoring apparatus in a first time period when the anti-PID apparatus and the insulation-monitoring apparatus alternately operate in different time periods; and
   operating the insulation-monitoring apparatus while disabling operation of the anti-PID apparatus in a second time period when the anti-PID apparatus and the insulation-monitoring apparatus alternately operate in the different time periods.

19. The linkage protection method of claim 17, further comprising enabling direct or indirect communication between the anti-PID apparatus and the insulation-monitoring apparatus via a Modbus Protocol or a dry contact.

20. A linkage protection system implemented by a photovoltaic system and comprising:
   an inverter comprising an inverter input end and an inverter output end;
   a data collection apparatus comprising a first dry contact; and
   an insulation-monitoring apparatus coupled to the inverter and comprising a second dry contact, wherein the insulation-monitoring apparatus is configured to:
      indirectly communicate with the first dry contact via the second dry contact;
      inject an insulation-monitoring voltage into an inverter direct current (DC) side or into an inverter alternating current (AC) side, wherein the inverter input end is coupled to the inverter DC side, and wherein the inverter output end is coupled to the inverter AC side;
      communicate with an anti-potential-induced degradation (PID) apparatus to perform linkage control; and
      alternately operate the anti-PID apparatus and the insulation-monitoring apparatus in different time periods based on communication with the anti-PID apparatus.

* * * * *